United States Patent
Wang et al.

(10) Patent No.: US 12,513,055 B2
(45) Date of Patent: Dec. 30, 2025

(54) ANALYTICS CONTROL

(71) Applicant: Nokia Technologies Oy, Espoo (FI)

(72) Inventors: Xin Wang, Qingdao (CN); Gerald Kunzmann, Munich (DE); Bruno Landais, Lannion (FR); Fabio Giust, Munich (DE)

(73) Assignee: Nokia Technologies Oy, Espoo (FI)

( * ) Notice: Subject to any disclaimer, the term of this patent is extended or adjusted under 35 U.S.C. 154(b) by 57 days.

(21) Appl. No.: 18/447,065

(22) Filed: Aug. 9, 2023

(65) Prior Publication Data
US 2024/0056364 A1    Feb. 15, 2024

(30) Foreign Application Priority Data

Aug. 10, 2022    (WO) ................. PCT/EP2022/072467

(51) Int. Cl.
*H04L 41/147*    (2022.01)
*H04L 41/14*    (2022.01)

(52) U.S. Cl.
CPC .......... *H04L 41/147* (2013.01); *H04L 41/145* (2013.01)

(58) Field of Classification Search
None
See application file for complete search history.

(56) References Cited

U.S. PATENT DOCUMENTS

| | | |
|---|---|---|
| 2019/0356558 A1 | 11/2019 | Han et al. |
| 2021/0014141 A1 | 1/2021 | Patil et al. |
| 2021/0144076 A1 | 5/2021 | Lee et al. |
| 2021/0320844 A1 | 10/2021 | Kumar et al. |
| 2021/0367854 A1 | 11/2021 | Lee |
| 2022/0108214 A1 | 4/2022 | Lee et al. |
| 2023/0142427 A1* | 5/2023 | Shariat ................. H04W 24/10 709/224 |
| 2024/0244466 A1* | 7/2024 | Shariat ................. H04W 24/02 |

FOREIGN PATENT DOCUMENTS

| | | |
|---|---|---|
| WO | 2019/242624 A1 | 12/2019 |
| WO | 2021/172810 A1 | 9/2021 |
| WO | 2022/243046 A1 | 11/2022 |

OTHER PUBLICATIONS

"3rd Generation Partnership Project; Technical Specification Group Services and System Aspects; Architecture enhancements for 5G System (5GS) to support network data analytics services (Release 17)", 3GPP TS 23.288, V17.4.0, Mar. 2022, pp. 1-205.

"New Solution on KI#1: Detect and Improve correctness of NWDAF analytics", 3GPP TSG-WG SA2 Meeting #150E e-meeting, S2-2202062, Agenda: 9.23, Huawei, Apr. 6-12, 2022, pp. 1-6.

(Continued)

*Primary Examiner* — Fadi Haj Said
(74) *Attorney, Agent, or Firm* — Nokia Technologies Oy

(57) ABSTRACT

The present disclosure provides measures for analytics control. Such measures exemplarily comprise receiving, from a network entity consuming analytics, an analytics demand including an input data identifier indicative of input data on the basis of which said analytics are to be performed, obtaining the input data based on the input data identifier, performing said analytics on the basis of said input data, and providing, to said network entity consuming analytics, a result of said analytics.

9 Claims, 23 Drawing Sheets

(56) References Cited

OTHER PUBLICATIONS

"3rd Generation Partnership Project; Technical Specification Group Services and System Aspects; Study of Enablers for Network Automation for 5G 5G System (5GS); Phase 3 (Release 18)", 3GPP TR 23.700-81, V0.3.0, May 2022, pp. 1-191.

"3rd Generation Partnership Project; Technical Specification Group Core Network and Terminals; 5G System; Network Data Analytics Services; Stage 3 (Release 17)", 3GPP TS 29.520, V17.6.0, Mar. 2022, pp. 1-218.

"3rd Generation Partnership Project; Technical Specification Group Core Network and Terminals; 5G System; Analytics Data Repository Services; Stage 3 (Release 17)", 3GPP TS 29.575, V17.0.0, Mar. 2022, pp. 1-49.

Sevgican et al., "Intelligent network data analytics function in 5G cellular networks using machine learning", Journal of Communications and Networks, vol. 22, No. 3, Jun. 2020, pp. 269-280.

International Search Report and Written Opinion received for corresponding Patent Cooperation Treaty Application No. PCT/EP2022/072467, dated Feb. 28, 2023, 12 pages.

\* cited by examiner

ANALYTICS CONTROL

CROSS-REFERENCE TO RELATED APPLICATIONS

This patent application claims the benefit of priority of Patent Cooperation Treaty Patent Application No. PCT/EP2022/072467 filed Aug. 10, 2022, the contents of which are hereby incorporated by reference as if reproduced in their entirety.

FIELD

Various example embodiments relate to analytics control. More specifically, various example embodiments exemplarily relate to measures (including methods, apparatuses and computer program products) for realizing analytics control.

BACKGROUND

The present specification generally relates to control of analytics in mobile networks.

Network data analytics functions (NWDAF) can provide specific analytics information, which is either statistical information of past events, or predictive information.

FIG. 13 shows a schematic diagram of an example of a system environment including analytics capabilities, and in particular illustrates communications and accesses between the NWDAF, a storage for historical data (e.g. analytics data repository function (ADRF)), and an NWDAF service consumer.

For providing specific analytics information, the NWDAF provides predictive information based on "real" data, which it collects according to its own logic.

Hence, the problem arises that a service consumer (e.g., an NWDAF service consumer) cannot control what data to use for analytics.

Hence, there is a need to provide for analytics control.

SUMMARY

Various example embodiments aim at addressing at least part of the above issues and/or problems and drawbacks.

Various aspects of example embodiments are set out in the appended claims.

According to an exemplary aspect, there is provided a method of a network data analytics function entity providing analytics based on collected network operation data, the method comprising receiving, from a network entity consuming analytics, an analytics demand including an input data identifier indicative of input data on the basis of which said analytics are to be performed, obtaining the input data based on the input data identifier, performing said analytics on the basis of said input data, and providing, to said network entity consuming analytics, a result of said analytics.

According to an exemplary aspect, there is provided a method of a network entity consuming analytics, the method comprising transmitting, to a network data analytics function entity providing analytics based on collected network operation data, an analytics demand including an input data identifier indicative of input data on the basis of which analytics are to be performed, and receiving, from said network data analytics function, an analytics result of said analytics performed on the basis of said input data.

According to an exemplary aspect, there is provided a method of a network data analytics function entity providing analytics based on collected network operation data, the method comprising receiving, from a network entity, a simulation demand indicative of simulation conditions characterizing a network scenario to be simulated, translating said simulation conditions into input data on the basis of which analytics are to be performed, performing said analytics on the basis of said input data, generating a simulation result on the basis of a result of said analytics, and transmitting, to said network entity, said simulation result.

According to an exemplary aspect, there is provided a method of a data repository function entity, the method comprising receiving a data storage request indicative of a data source and an input data identifier to be used, subscribing to said data source, and storing input data retrieved from said data source together with said input data identifier.

According to an exemplary aspect, there is provided an apparatus of a network data analytics function entity providing analytics based on collected network operation data, the apparatus comprising receiving circuitry configured to receive, from a network entity consuming analytics, an analytics demand including an input data identifier indicative of input data on the basis of which said analytics are to be performed, obtaining circuitry configured to obtain the input data based on the input data identifier, performing circuitry configured to perform said analytics on the basis of said input data, and providing circuitry configured to provide, to said network entity consuming analytics, a result of said analytics.

According to an exemplary aspect, there is provided an apparatus of a network entity consuming analytics, the apparatus comprising transmitting circuitry configured to transmit, to a network data analytics function entity providing analytics based on collected network operation data, an analytics demand including an input data identifier indicative of input data on the basis of which analytics are to be performed, and receiving circuitry configured to receive, from said network data analytics function, an analytics result of said analytics performed on the basis of said input data.

According to an exemplary aspect, there is provided an apparatus of a network data analytics function entity providing analytics based on collected network operation data, the apparatus comprising receiving circuitry configured to receive, from a network entity, a simulation demand indicative of simulation conditions characterizing a network scenario to be simulated, translating circuitry configured to translate said simulation conditions into input data on the basis of which analytics are to be performed, performing circuitry configured to perform said analytics on the basis of said input data, generating circuitry configured to generate a simulation result on the basis of a result of said analytics, and transmitting circuitry configured to transmit, to said network entity, said simulation result.

According to an exemplary aspect, there is provided an apparatus of a data repository function entity, the apparatus comprising receiving circuitry configured to receive a data storage request indicative of a data source and an input data identifier to be used, subscribing circuitry configured to subscribe to said data source, and storing circuitry configured to store input data retrieved from said data source together with said input data identifier.

According to an exemplary aspect, there is provided an apparatus of a network data analytics function entity providing analytics based on collected network operation data, the apparatus comprising at least one processor, at least one memory including computer program code, and at least one interface configured for communication with at least another apparatus, the at least one processor, with the at least one memory and the computer program code, being configured to cause the apparatus to perform receiving, from a network entity consuming analytics, an analytics demand including an input data identifier indicative of input data on the basis of which said analytics are to be performed, obtaining the input data based on the input data identifier, performing said analytics on the basis of said input data, and providing, to said network entity consuming analytics, a result of said analytics.

According to an exemplary aspect, there is provided an apparatus of a network data analytics function entity providing analytics based on collected network operation data, the apparatus comprising at least one processor, at least one memory including computer program code, and at least one interface configured for communication with at least another apparatus, the at least one processor, with the at least one memory and the computer program code, being configured to cause the apparatus to perform transmitting, to a network data analytics function entity providing analytics based on collected network operation data, an analytics demand including an input data identifier indicative of input data on the basis of which analytics are to be performed, and receiving, from said network data analytics function, an analytics result of said analytics performed on the basis of said input data.

According to an exemplary aspect, there is provided an apparatus of a network data analytics function entity providing analytics based on collected network operation data, the apparatus comprising at least one processor, at least one memory including computer program code, and at least one interface configured for communication with at least another apparatus, the at least one processor, with the at least one memory and the computer program code, being configured to cause the apparatus to perform receiving, from a network entity, a simulation demand indicative of simulation conditions characterizing a network scenario to be simulated, translating said simulation conditions into input data on the basis of which analytics are to be performed, performing said analytics on the basis of said input data, generating a simulation result on the basis of a result of said analytics, and transmitting, to said network entity, said simulation result.

According to an exemplary aspect, there is provided an apparatus of a network data analytics function entity providing analytics based on collected network operation data, the apparatus comprising at least one processor, at least one memory including computer program code, and at least one interface configured for communication with at least another apparatus, the at least one processor, with the at least one memory and the computer program code, being configured to cause the apparatus to perform receiving a data storage request indicative of a data source and an input data identifier to be used, subscribing to said data source, and storing input data retrieved from said data source together with said input data identifier.

According to an exemplary aspect, there is provided a computer program product comprising computer-executable computer program code which, when the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient control of data to be used for analytics to thereby solve at least part of the problems and drawbacks identified in relation to the prior art.

By way of example embodiments, there is provided analytics control. More specifically, by way of example embodiments, there are provided measures and mechanisms for realizing analytics control.

Thus, improvement is achieved by methods, apparatuses and computer program products enabling/realizing analytics control.

BRIEF DESCRIPTION OF THE DRAWINGS

In the following, the present disclosure will be described in greater detail by way of non-limiting examples with reference to the accompanying drawings, in which.

DETAILED DESCRIPTION

The present disclosure is described herein with reference to particular non-limiting examples and to what are presently considered to be conceivable embodiments. A person skilled in the art will appreciate that the disclosure is by no means limited to these examples, and may be more broadly applied.

It is to be noted that the following description of the present disclosure and its embodiments mainly refers to specifications being used as non-limiting examples for certain exemplary network configurations and deployments. Namely, the present disclosure and its embodiments are mainly described in relation to 3GPP specifications being used as non-limiting examples for certain exemplary network configurations and deployments. As such, the description of example embodiments given herein specifically refers to terminology which is directly related thereto. Such terminology is only used in the context of the presented non-limiting examples, and does naturally not limit the disclosure in any way. Rather, any other communication or communication related system deployment, etc. may also be utilized as long as compliant with the features described herein.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to example embodiments, in general terms, there are provided measures and mechanisms for (enabling/realizing) analytics control.

As mentioned above, the NWDAF provides predictive information based on "real" data.

There is no "simulation" service in NWDAF, or a service providing analytics based on predefined data. Thus, the NWDAF cannot provide "what if" answers, as illustrated in FIG. 14.

Figure 14:
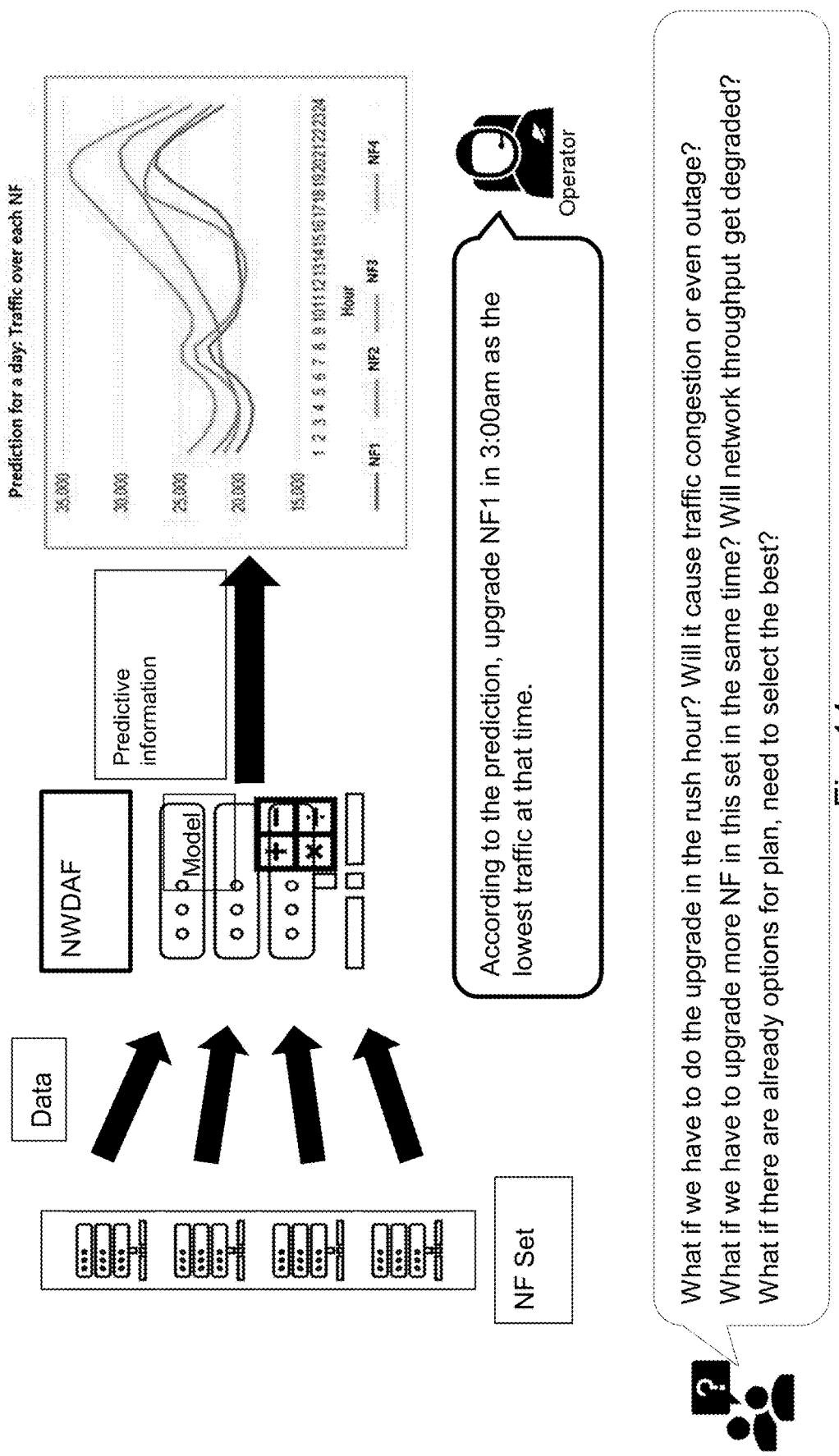
FIG. 14 shows a schematic diagram illustrating an example scenario handled utilizing analytics.

FIG. 14 shows a schematic diagram illustrating an example scenario handled utilizing analytics.

In some simulation services, multiple analytics may be required to perform one simulation, in other words, a logic aggregation across analytics/models may be needed, or a prediction may be based on another prediction.

In real life, most of the decisions are made under some conditions (constraints) beyond the awareness of a telecommunication network, or the NWDAF data collection or knowledge system.

Hence, the NWDAF considering really occurring "events" or "actions" (i.e., those leading to "real" data may compare differences between prediction and statistics of the respective "event" or "action", and may provide feedback to improve the analytics accuracy.

According to example embodiments, the quality of decision may be improved by control of the data to be considered for the analytics.

In particular, in brief, according to example embodiments, network data analytics capabilities in the 5GS are extended to support predefined scenarios (e.g. simulation scenarios, which correspond to hypothetical scenarios with specific simulation conditions), by supporting new capabilities enabling:

- a (simulation) user (e.g. operator or an 5GC NF service consumer) to request a (simulation) report or suggestion to a new (simulation) AF (more general: AF consuming analytics) or directly to the NDWAF, for a (simulation) scenario described by (simulation) conditions,
- a new (simulation) AF (more general: AF consuming analytics) or the NDWAF to translate the (simulation) conditions into (simulation) data (input data),
- the (simulation) AF (more general: AF consuming analytics) (or (simulation) user) to provide the NDWAF with the (simulation) data (input data) and to request the NDWAF to generate analytics using the (simulation) data, and
- the simulation AF (more general: AF consuming analytics) or the NDWAF to generate a (simulation) report or suggestion for the (simulation) scenario.

The (simulation) conditions may correspond to e.g. a list of normal or abnormal events, actions or changes to the network. Normal events may for example include a monitor request received for a particular user equipment (UE) in a certain period, or a roaming subscriber count from a certain public land mobile network (PLMN). Abnormal events may for example include power outage, link disconnected, or a software malfunction. Actions may for example include a configuration change, traffic steering, or a software upgrade.

Example embodiments are specified below in more detail.

Figure 1:
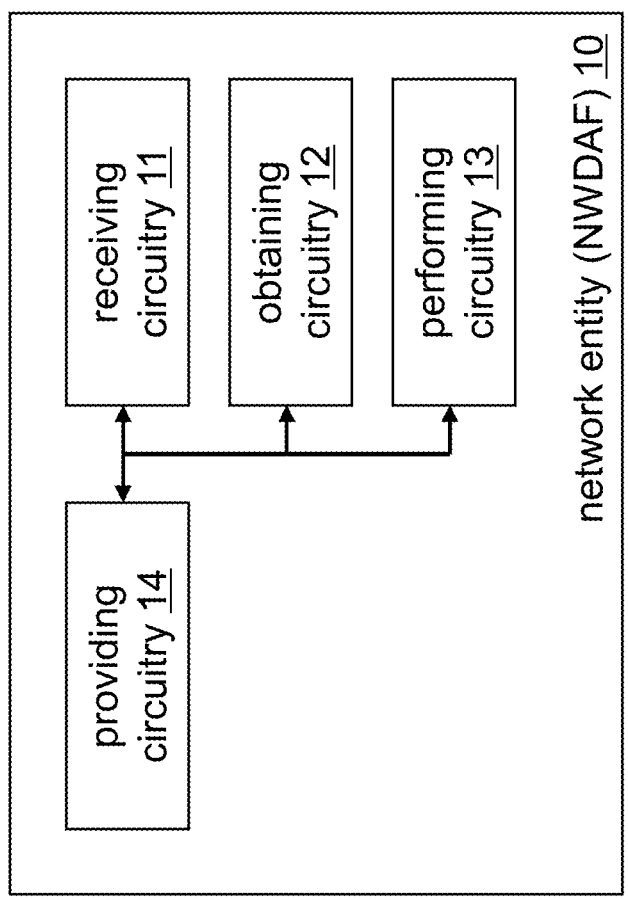
FIG. 1 is a block diagram illustrating an apparatus according to example embodiments.
Figure 9:
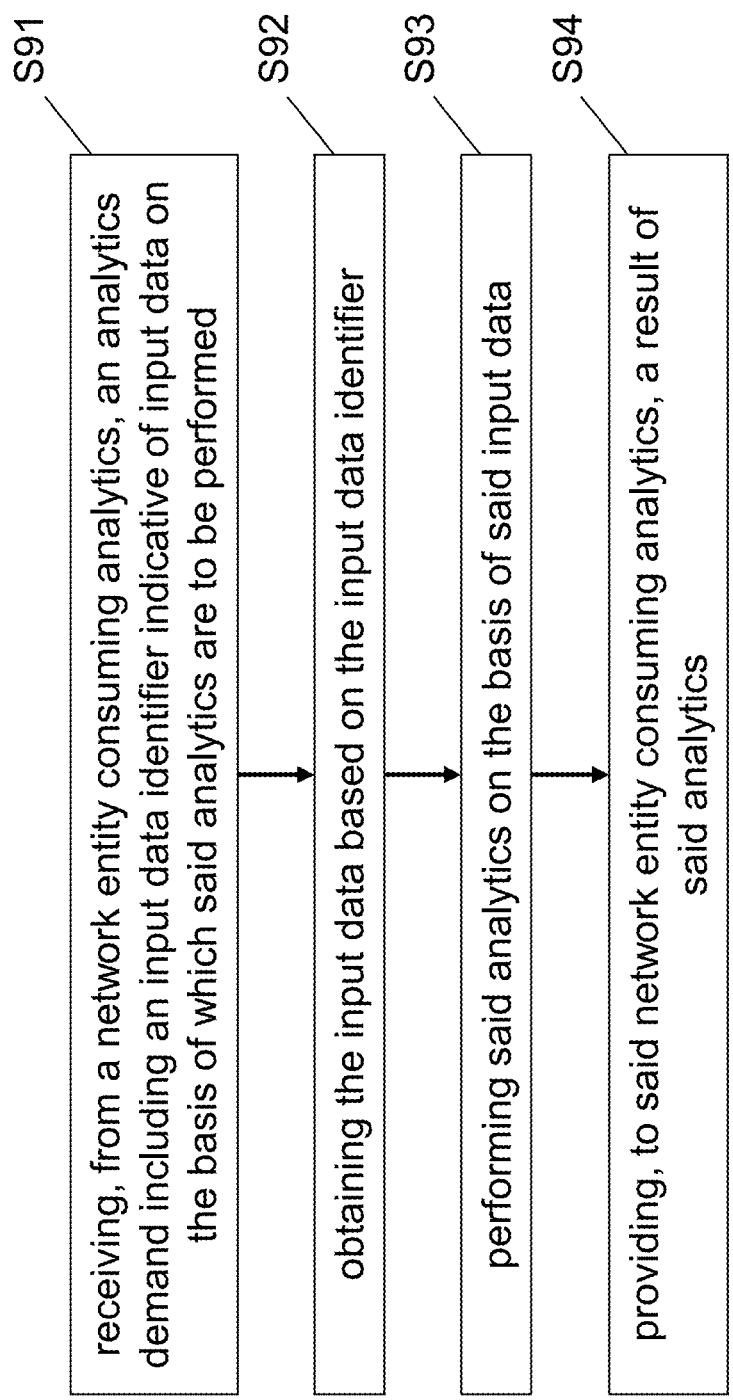
FIG. 9 is a schematic diagram of a procedure according to example embodiments.

FIG. 1 is a block diagram illustrating an apparatus according to example embodiments. The apparatus may be a network node or entity 10 such as a network data analytics function entity (e.g. NWDAF) providing analytics based on collected network operation data, the apparatus comprising a receiving circuitry 11, an obtaining circuitry 12, a performing circuitry 13, and a providing circuitry 14. The receiving circuitry 11 receives, from a network entity consuming analytics, an analytics demand including an input data identifier indicative of input data on the basis of which said analytics are to be performed. The obtaining circuitry 12 obtains the input data based on the input data identifier. The performing circuitry 13 performs said analytics on the basis of said input data. The providing circuitry 14 provides, to said network entity consuming analytics, a result of said analytics. FIG. 9 is a schematic diagram of a procedure according to example embodiments. The apparatus according to FIG. 1 may perform the method of FIG. 9 but is not limited to this method. The method of FIG. 9 may be performed by the apparatus of FIG. 1 but is not limited to being performed by this apparatus.

As shown in FIG. 9, a procedure according to example embodiments comprises an operation of receiving (S91), from a network entity consuming analytics, an analytics demand including an input data identifier indicative of input data on the basis of which said analytics are to be performed, an operation of obtaining (S92) the input data based on the input data identifier, an operation of performing (S93) said analytics on the basis of said input data, and an operation of providing (S94), to said network entity consuming analytics, a result of said analytics.

Figure 2:
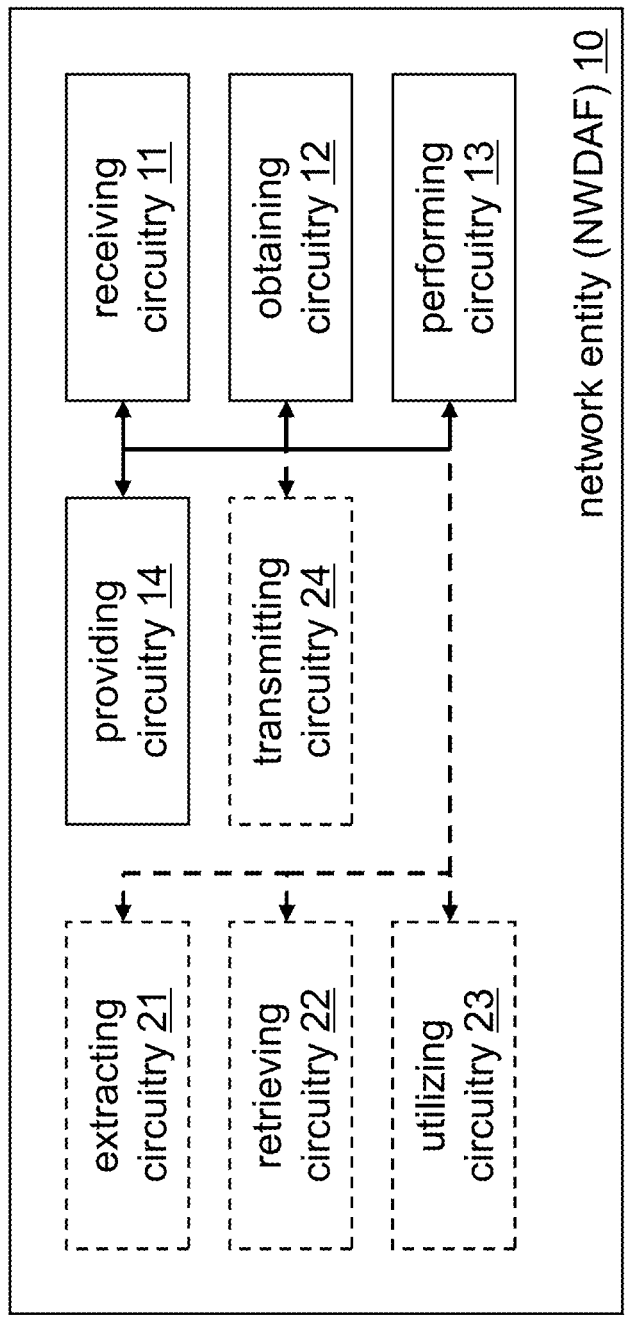
FIG. 2 is a block diagram illustrating an apparatus according to example embodiments.

FIG. 2 is a block diagram illustrating an apparatus according to example embodiments. In particular, FIG. 2 illustrates a variation of the apparatus shown in FIG. 1. The apparatus according to FIG. 2 may thus further comprise an extracting circuitry 21, a retrieving circuitry 22, a utilizing circuitry 23, and/or a transmitting circuitry 24.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 9, exemplary additional operations and exemplary details of the obtaining operation (S92) are given, which are inherently independent from each other as such. According to such variation, said analytics demand includes said input data. Further, such exemplary obtaining operation (S92) according to example embodiments may comprise an operation of extracting said input data from said analytics demand.

According to a variation of the procedure shown in FIG. 9, exemplary additional operations and exemplary details of the obtaining operation (S92) are given, which are inherently independent from each other as such. According to such variation, said analytics demand includes a pointer to said input data. Further, such exemplary obtaining operation (S92) according to example embodiments may comprise an operation of retrieving said input data from a network location indicated by said pointer utilizing said input data identifier.

According to a variation of the procedure shown in FIG. 9, exemplary details of the obtaining operation (S92) are given, which are inherently independent from each other as such. Such exemplary obtaining operation (S92) according to example embodiments may comprise an operation of retrieving said input data from a network location utilizing said input data identifier.

According to further example embodiments, said analytics demand is an analytics request.

According to further example embodiments, said analytics demand is an analytics subscription.

According to further example embodiments, said analytics demand includes an indicator that said analytics demand is a simulation analytics demand.

According to further example embodiments, said result of said analytics is indicative of that said result of said analytics is based on said analytics demand and said input data.

According to further example embodiments, said result of said analytics is indicative of analytics meta data.

According to a variation of the procedure shown in FIG. 9, exemplary details of the performing operation (S93) are given, which are inherently independent from each other as such. Such exemplary performing operation (S93) according to example embodiments may comprise an operation of utilizing a machine learning model.

According to a variation of the procedure shown in FIG. 9, exemplary additional operations are given, which are inherently independent from each other as such. According to such variation, an exemplary method according to example embodiments may comprise an operation of transmitting a demand for generation of said machine learning model, said demand for generation of said machine learning model being indicative of said input data.

According to further example embodiments, said demand for generation of said machine learning model includes said input data.

According to further example embodiments, said demand for generation of said machine learning model includes said input data identifier.

According to further example embodiments, said demand for generation of said machine learning model includes a pointer to said input data.

According to further example embodiments, said demand for generation of said machine learning model includes an indicator that said demand for generation of said machine learning model is a simulation machine learning model demand.

According to a variation of the procedure shown in FIG. 9, exemplary additional operations are given, which are inherently independent from each other as such. According to such variation, an exemplary method according to example embodiments may comprise an operation of transmitting, towards a data repository function entity, a data storage request, wherein said data storage request is indicative of at least one of said input data, said result of said analytics, and said machine learning model.

According to further example embodiments, said data storage request includes an indicator that said data storage request is a simulation related data storage request.

According to further example embodiments, said network entity consuming analytics is a simulation service interface entity.

According to further example embodiments, said input data is simulation data.

Figure 3:
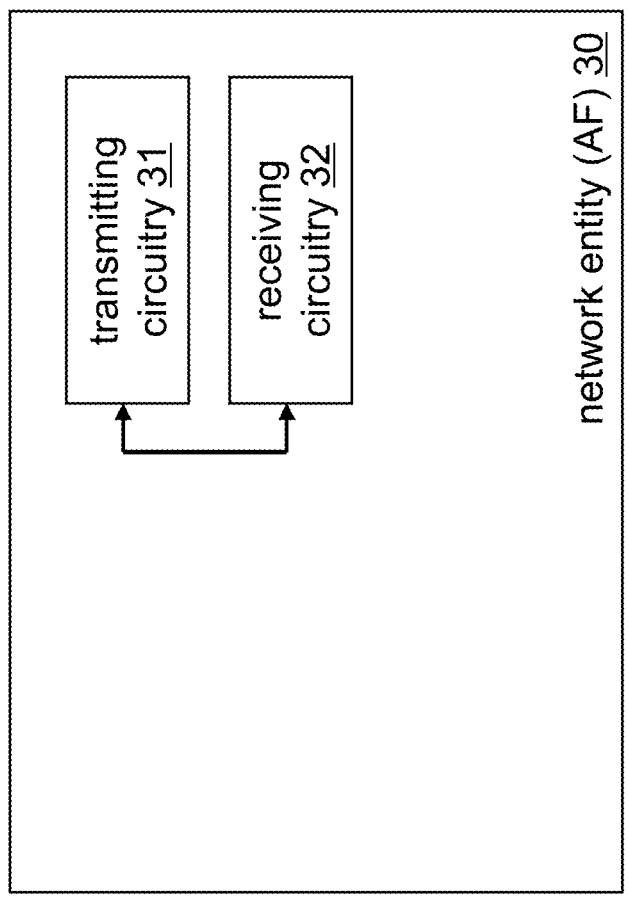
FIG. 3 is a block diagram illustrating an apparatus according to example embodiments.

FIG. 3 is a block diagram illustrating an apparatus according to example embodiments. The apparatus may be a network node or entity 30 such as a network entity consuming analytics (e.g. application function (AF)), the apparatus comprising a transmitting circuitry 31 and a receiving circuitry 32. The transmitting circuitry 31 transmits, to a network data analytics function entity providing analytics based on collected network operation data, an analytics demand including an input data identifier indicative of input data on the basis of which analytics are to be performed. The receiving circuitry 32 receives, from said network data analytics function, analytics result of said analytics performed on the basis of said input data.

Figure 10:
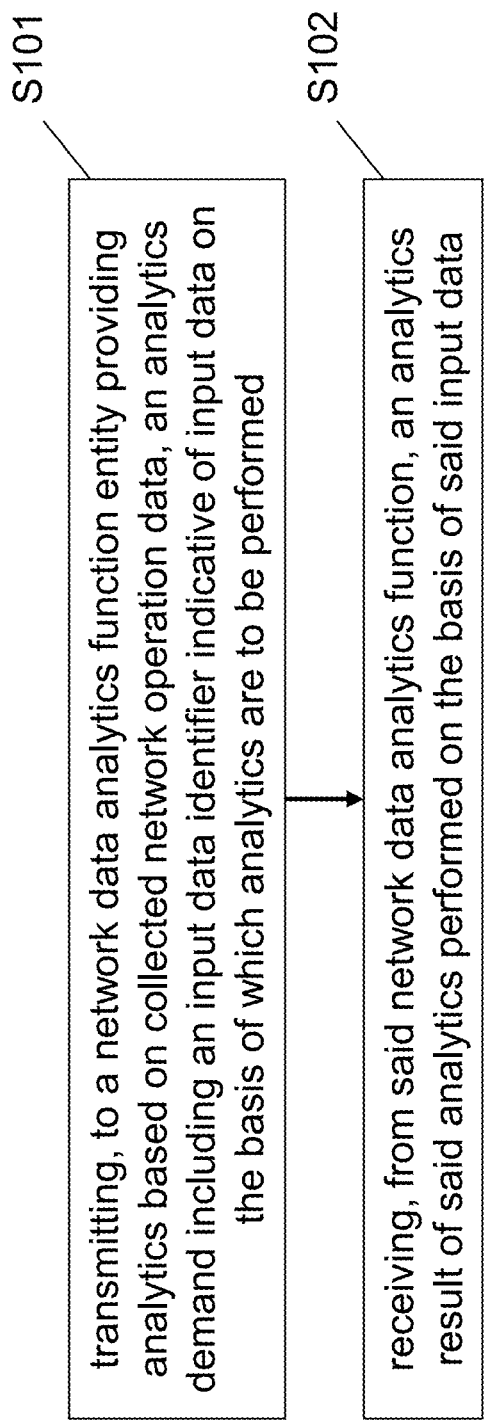
FIG. 10 is a schematic diagram of a procedure according to example embodiments.

FIG. 10 is a schematic diagram of a procedure according to example embodiments. The apparatus according to FIG. 3 may perform the method of FIG. 10 but is not limited to this method. The method of FIG. 10 may be performed by the apparatus of FIG. 3 but is not limited to being performed by this apparatus.

As shown in FIG. 10, a procedure according to example embodiments comprises an operation of transmitting (S101), to a network data analytics function entity providing analytics based on collected network operation data, an analytics demand including an input data identifier indicative of input data on the basis of which analytics are to be performed, and an operation of receiving (S102), from said network data analytics function, an analytics result of said analytics performed on the basis of said input data.

Figure 4:
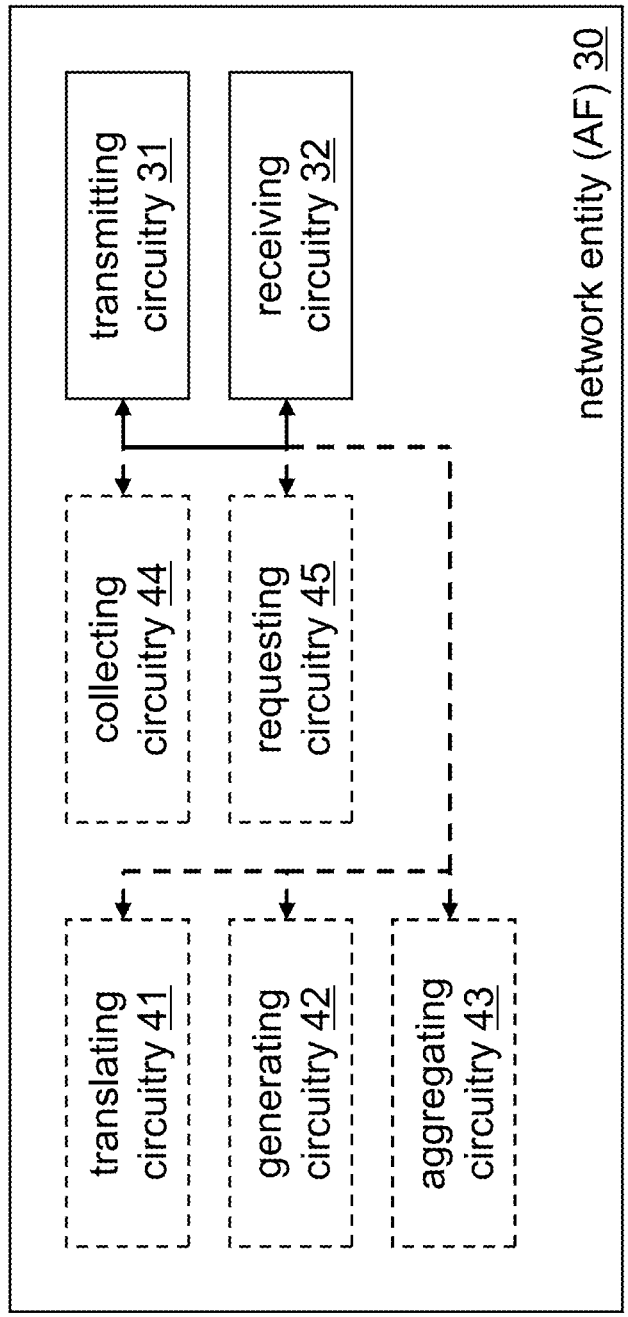
FIG. 4 is a block diagram illustrating an apparatus according to example embodiments.

FIG. 4 is a block diagram illustrating an apparatus according to example embodiments. In particular, FIG. 4 illustrates a variation of the apparatus shown in FIG. 3. The apparatus according to FIG. 4 may thus further comprise a translating circuitry 41, a generating circuitry 42, an aggregating circuitry 43, a collecting circuitry 44, and/or a requesting circuitry 45.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to further example embodiments, said analytics result is indicative of said input data.

According to further example embodiments, said analytics demand includes said input data.

According to further example embodiments, said analytics demand includes a pointer to said input data.

According to further example embodiments, said analytics demand is an analytics request.

According to further example embodiments, said analytics demand is an analytics subscription.

According to further example embodiments, said analytics demand includes an indicator that said analytics demand is a simulation analytics demand.

According to further example embodiments, said analytics result is indicative of that said analytics result is based on said analytics demand and said input data.

According to further example embodiments, said analytics result is indicative of analytics meta data.

According to a variation of the procedure shown in FIG. 10, exemplary additional operations are given, which are inherently independent from each other as such. According to such variation, an exemplary method according to example embodiments may comprise an operation of receiving, from a network entity, a simulation demand indicative of simulation conditions characterizing a network scenario to be simulated, an operation of translating said simulation conditions into said input data, an operation of generating a simulation result on the basis of said analytics result, and an operation of transmitting, to said network entity, said simulation result.

According to further example embodiments, said simulation result includes a simulation report.

According to further example embodiments, said simulation result includes a suggestion for addressing said network scenario to be simulated.

According to a variation of the procedure shown in FIG. 10, exemplary details of the transmitting operation (S101), the receiving operation (S102), and the generating operation are given, which are inherently independent from each other as such. Such exemplary transmitting operation (S101) according to example embodiments may comprise an operation of transmitting, to a first network data analytics function entity as said network data analytics function entity, a first analytics demand as said analytics demand, and an operation of transmitting, to a second network data analytics function entity as said network data analytics function entity, a second analytics demand as said analytics demand. Such exemplary receiving operation (S102) according to example embodiments may comprise an operation of receiving, from said first network data analytics function, a first analytics result as said analytics result, and an operation of receiving, from said second network data analytics function, a second analytics result as said analytics result. Such exemplary generating operation according to example embodiments may comprise an operation of aggregating said first analytics result and said second analytics result to an aggregated analytics result, and an operation of generating said simulation result on the basis of said aggregated analytics result.

According to a variation of the procedure shown in FIG. 10, exemplary additional operations are given, which are inherently independent from each other as such. According to such variation, an exemplary method according to example embodiments may comprise an operation of collecting information on a setup for which said network scenario is to be simulated, wherein said translating is based on said information on said setup.

According to a variation of the procedure shown in FIG. 10, exemplary additional operations are given, which are inherently independent from each other as such. According to such variation, an exemplary method according to example embodiments may comprise an operation of requesting initial analytics for said network scenario to be simulated, and an operation of receiving said initial analytics, wherein said translating is based on said information on said initial analytics.

According to further example embodiments, said network entity consuming analytics is a simulation service interface entity.

According to further example embodiments, said input data is simulation data.

Figure 5:
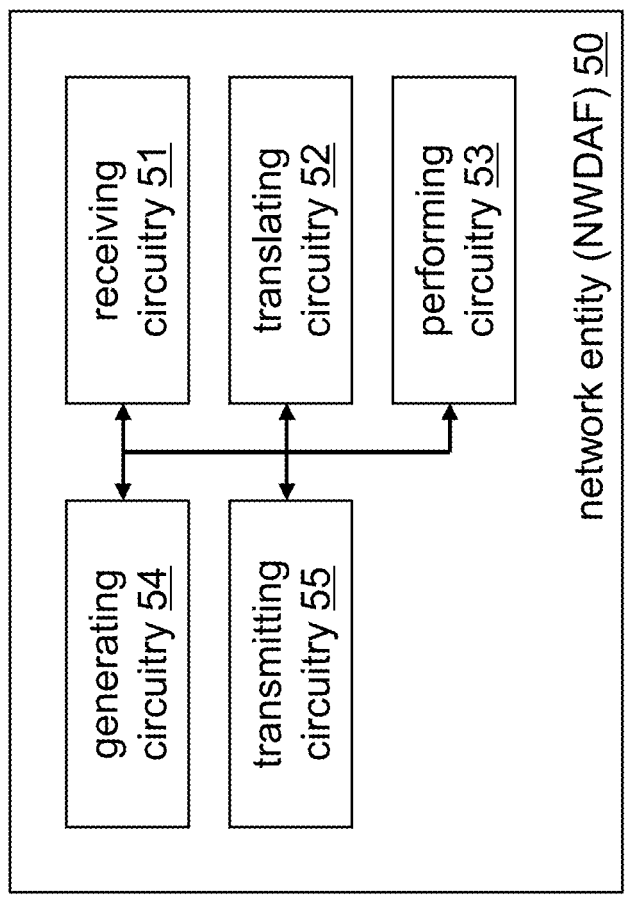
FIG. 5 is a block diagram illustrating an apparatus according to example embodiments.

FIG. 5 is a block diagram illustrating an apparatus according to example embodiments. The apparatus may be a network node or entity 50 such as a network data analytics function entity (e.g. NWDAF) providing analytics based on collected network operation data, the apparatus comprising a receiving circuitry 51, a translating circuitry 52, a performing circuitry 53, a generating circuitry 54, and a transmitting circuitry 55. The receiving circuitry 51 receives, from a network entity, a simulation demand indicative of simulation conditions characterizing a network scenario to be simulated. The translating circuitry 52 translates said simulation conditions into input data on the basis of which analytics are to be performed. The performing circuitry 53 performs said analytics on the basis of said input data. The generating circuitry 54 generates a simulation result on the basis of a result of said analytics. The transmitting circuitry 55 transmits, to said network entity, said simulation result.

Figure 11:
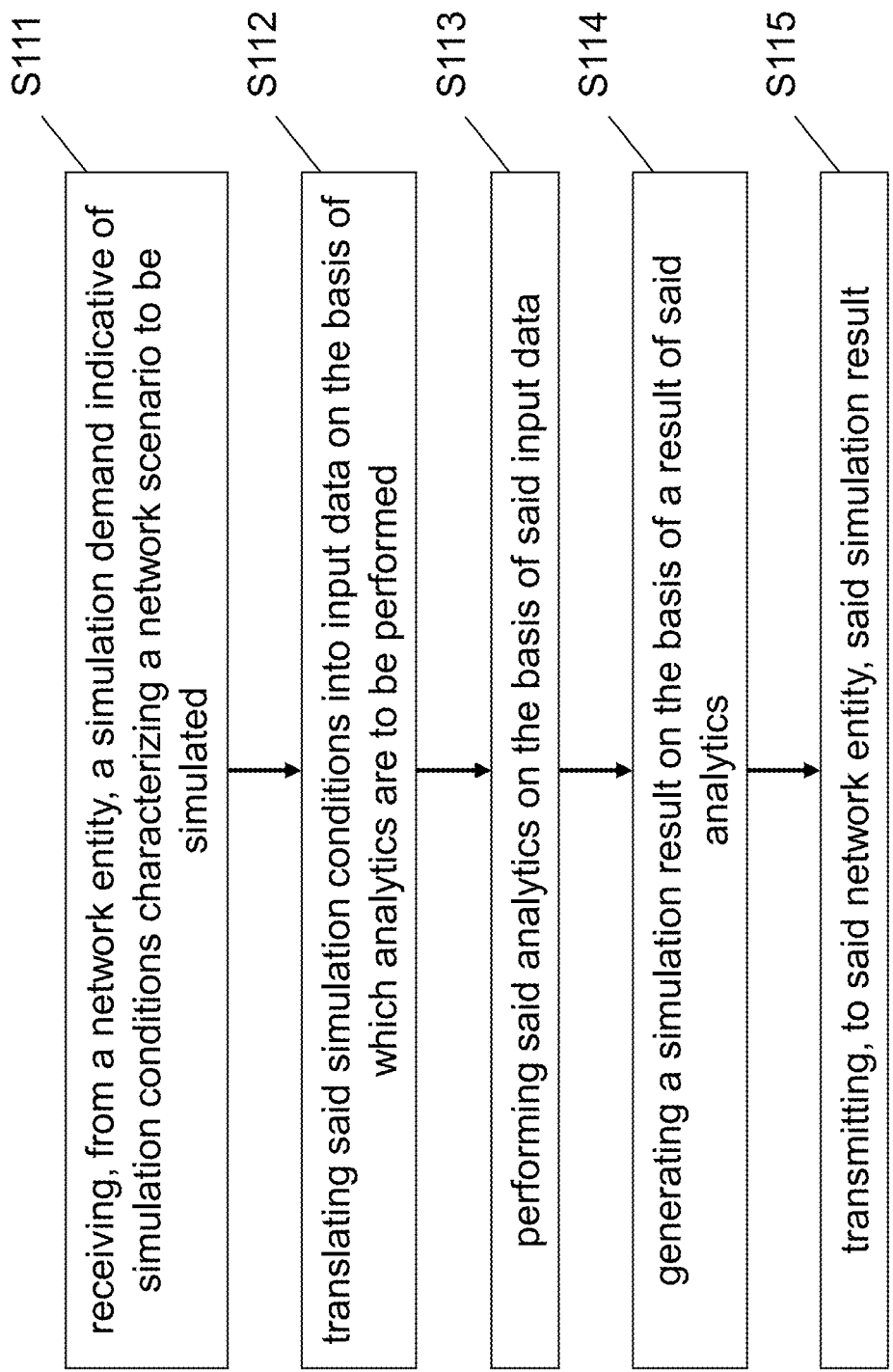
FIG. 11 is a schematic diagram of a procedure according to example embodiments.

FIG. 11 is a schematic diagram of a procedure according to example embodiments. The apparatus according to FIG. 5 may perform the method of FIG. 11 but is not limited to this method. The method of FIG. 11 may be performed by the apparatus of FIG. 5 but is not limited to being performed by this apparatus.

As shown in FIG. 11, a procedure according to example embodiments comprises an operation of receiving (S111), from a network entity, a simulation demand indicative of simulation conditions characterizing a network scenario to be simulated, an operation of translating (S112) said simulation conditions into input data on the basis of which analytics are to be performed, an operation of performing (S113) said analytics on the basis of said input data, an operation of generating (S114) a simulation result on the basis of a result of said analytics, and an operation of transmitting (S115), to said network entity, said simulation result.

Figure 6:
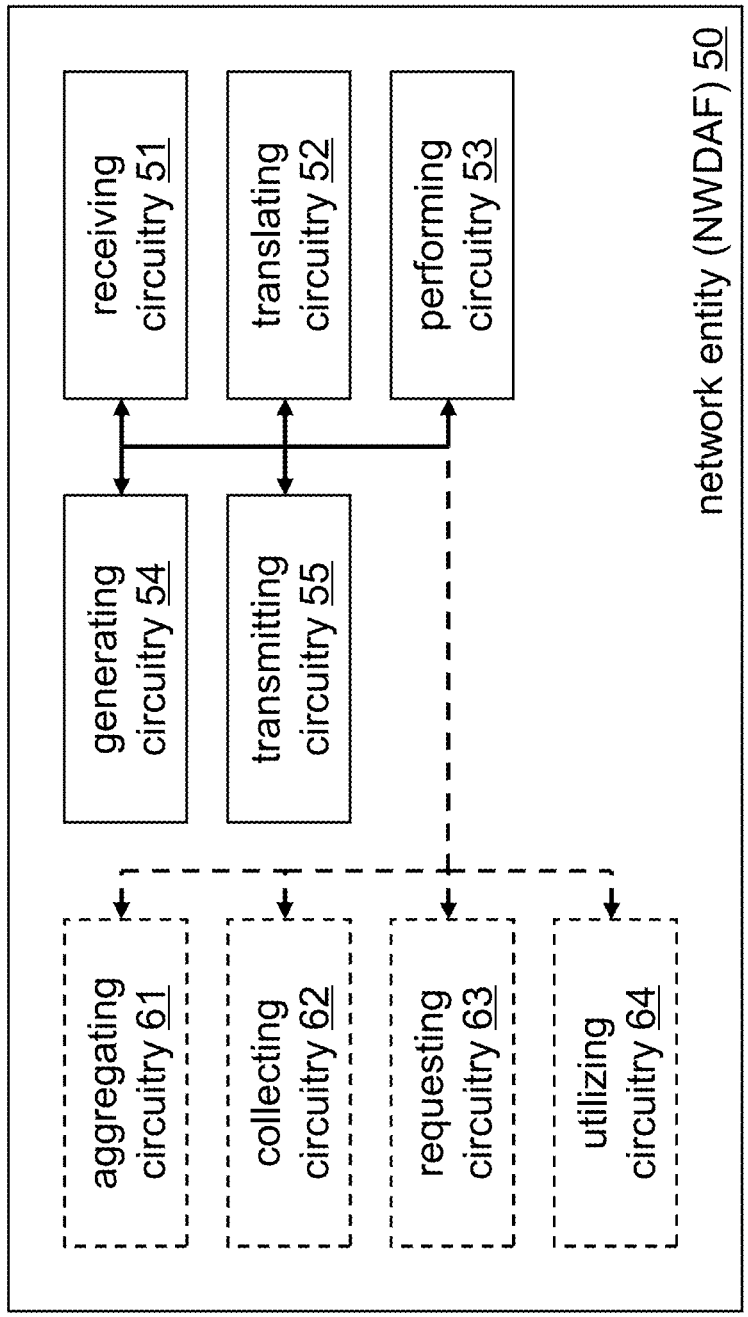
FIG. 6 is a block diagram illustrating an apparatus according to example embodiments.

FIG. 6 is a block diagram illustrating an apparatus according to example embodiments. In particular, FIG. 6 illustrates a variation of the apparatus shown in FIG. 5. The apparatus according to FIG. 6 may thus further comprise an aggregating circuitry 61, a collecting circuitry 62, a requesting circuitry 63, and/or a utilizing circuitry 64.

In an embodiment at least some of the functionalities of the apparatus shown in FIG. 5 (or 6) may be shared between two physically separate devices forming one operational entity. Therefore, the apparatus may be seen to depict the operational entity comprising one or more physically separate devices for executing at least some of the described processes.

According to further example embodiments, said simulation result includes a simulation report.

According to further example embodiments, said simulation result includes a suggestion for addressing said network scenario to be simulated.

According to a variation of the procedure shown in FIG. 11, exemplary details of the performing operation (S113) and the generating operation (S114) are given, which are inherently independent from each other as such. Such exemplary performing operation (S113) according to example embodiments may comprise an operation of performing first analytics as said analytics, and an operation of performing second analytics as said analytics. Such exemplary generating operation (S114) according to example embodiments may comprise an operation of aggregating a result of said first analytics and a result of said second analytics to an aggregated analytics result, and an operation of generating said simulation result on the basis of said aggregated analytics result.

According to a variation of the procedure shown in FIG. 11, exemplary additional operations are given, which are inherently independent from each other as such. According to such variation, an exemplary method according to example embodiments may comprise an operation of collecting information on a setup for which said network scenario is to be simulated, wherein said translating is based on said information on said setup.

According to a variation of the procedure shown in FIG. 11, exemplary additional operations are given, which are inherently independent from each other as such. According to such variation, an exemplary method according to example embodiments may comprise an operation of requesting initial analytics for said network scenario to be simulated, and an operation of receiving said initial analytics, wherein said translating is based on said information on said initial analytics.

According to a variation of the procedure shown in FIG. 11, exemplary details of the performing operation (S113) are given, which are inherently independent from each other as such. Such exemplary performing operation (S113) according to example embodiments may comprise an operation of utilizing a machine learning model.

According to a variation of the procedure shown in FIG. 11, exemplary additional operations are given, which are inherently independent from each other as such. According to such variation, an exemplary method according to example embodiments may comprise an operation of transmitting a demand for generation of said machine learning model, said demand for generation of said machine learning model being indicative of said input data.

According to further example embodiments, said demand for generation of said machine learning model includes said input data.

According to further example embodiments, said demand for generation of said machine learning model includes an input data identifier indicative of said input data.

According to further example embodiments, said demand for generation of said machine learning model includes a pointer to said input data.

According to further example embodiments, said demand for generation of said machine learning model includes an indicator that said demand for generation of said machine learning model is a simulation machine learning model demand.

According to a variation of the procedure shown in FIG. 11, exemplary additional operations are given, which are inherently independent from each other as such. According to such variation, an exemplary method according to example embodiments may comprise an operation of transmitting, towards a data repository function entity, a data storage request, wherein said data storage request is indicative of at least one of said input data, said input data identifier, said result of said analytics, said simulation result, and said machine learning model.

According to further example embodiments, said data storage request includes an indicator that said data storage request is a simulation related data storage request.

According to further example embodiments, said input data is simulation data.

Figure 7:
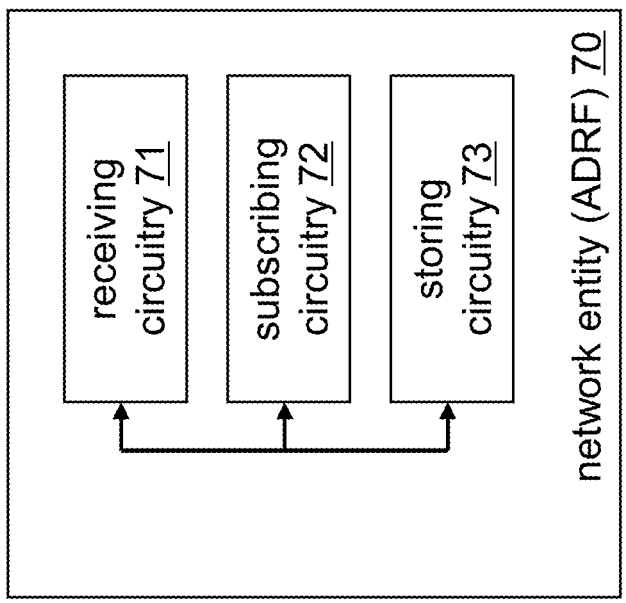
FIG. 7 is a block diagram illustrating an apparatus according to example embodiments.
Figure 12:
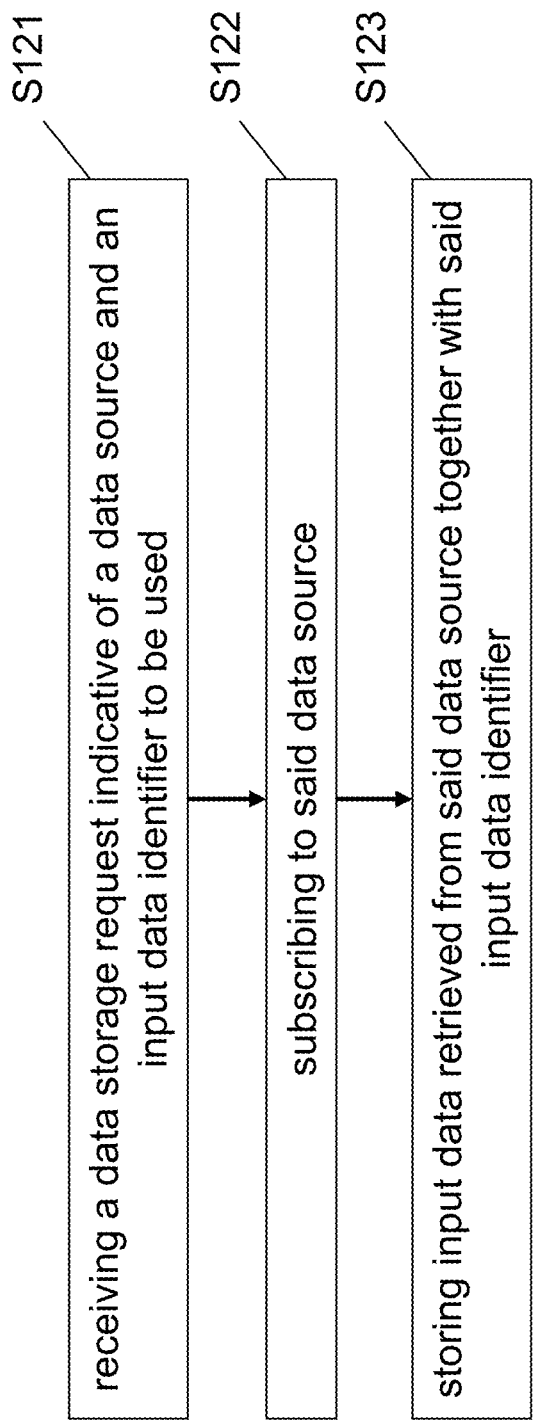
FIG. 12 is a schematic diagram of a procedure according to example embodiments.
Figure 13:
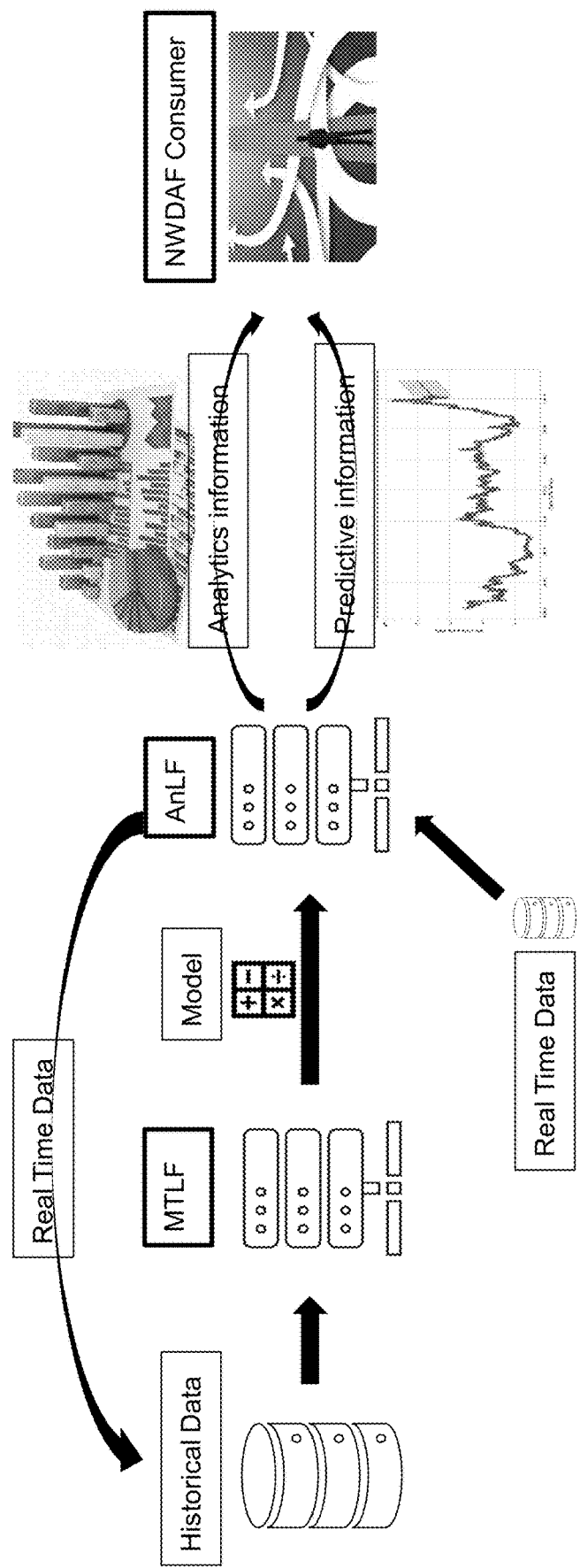
FIG. 13 shows a schematic diagram of an example of a system environment including analytics capabilities.

FIG. 7 is a block diagram illustrating an apparatus according to example embodiments. The apparatus may be a network node or entity 70 such as a data repository function entity (e.g. ADRF), the apparatus comprising a receiving circuitry 71, a subscribing circuitry 72, and a storing circuitry 73. The receiving circuitry 71 receives a data storage request indicative of a data source and an input data identifier to be used. The subscribing circuitry 72 subscribes to said data source. The storing circuitry 73 stores input data retrieved from said data source together with said input data identifier. FIG. 12 is a schematic diagram of a procedure according to example embodiments. The apparatus according to FIG. 7 may perform the method of FIG. 12 but is not limited to this method. The method of FIG. 12 may be performed by the apparatus of FIG. 7 but is not limited to being performed by this apparatus.

As shown in FIG. 12, a procedure according to example embodiments comprises an operation of receiving (S121) a data storage request indicative of a data source and an input data identifier to be used, an operation of subscribing (S122) to said data source, and an operation of storing (S123) input data retrieved from said data source together with said input data identifier.

Figure 8:
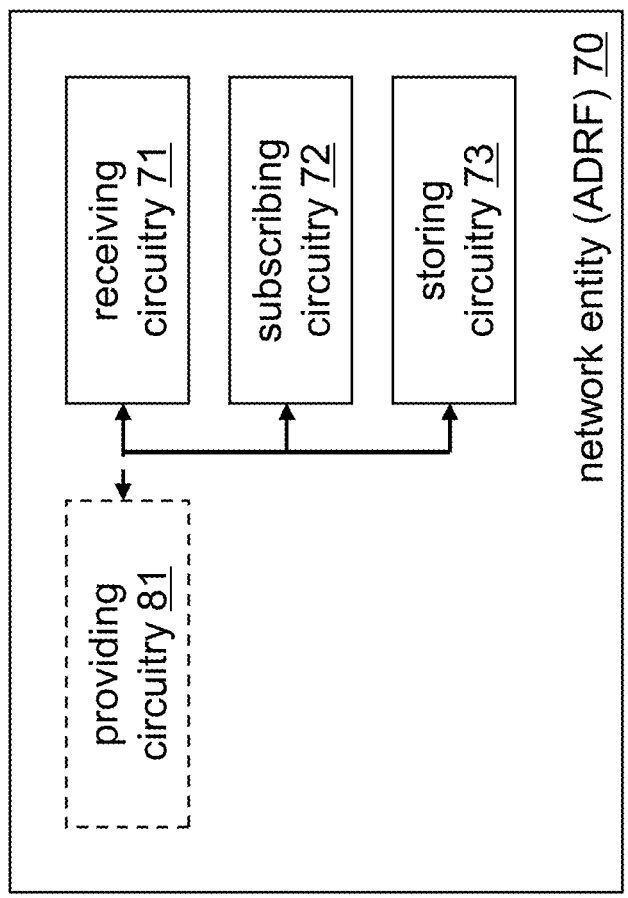
FIG. 8 is a block diagram illustrating an apparatus according to example embodiments.

FIG. 8 is a block diagram illustrating an apparatus according to example embodiments. In particular, FIG. 8 illustrates a variation of the apparatus shown in FIG. 7. The apparatus according to FIG. 8 may thus further comprise a providing circuitry 81.

In an embodiment at least some of the functionalities of the apparatus shown in FIG. 7 (or 8) may be shared between two physically separate devices forming one operational entity. Therefore, the apparatus may be seen to depict the operational entity comprising one or more physically separate devices for executing at least some of the described processes.

According to a variation of the procedure shown in FIG. 12, exemplary additional operations are given, which are inherently independent from each other as such. According to such variation, an exemplary method according to example embodiments may comprise an operation of receiving, from a data requesting entity, a data retrieval request, said data retrieval request including said input data identifier, and an operation of providing, to said data requesting entity, said input data stored together with said input data identifier.

Example embodiments outlined and specified above are explained below in more specific terms.

Figure 15:
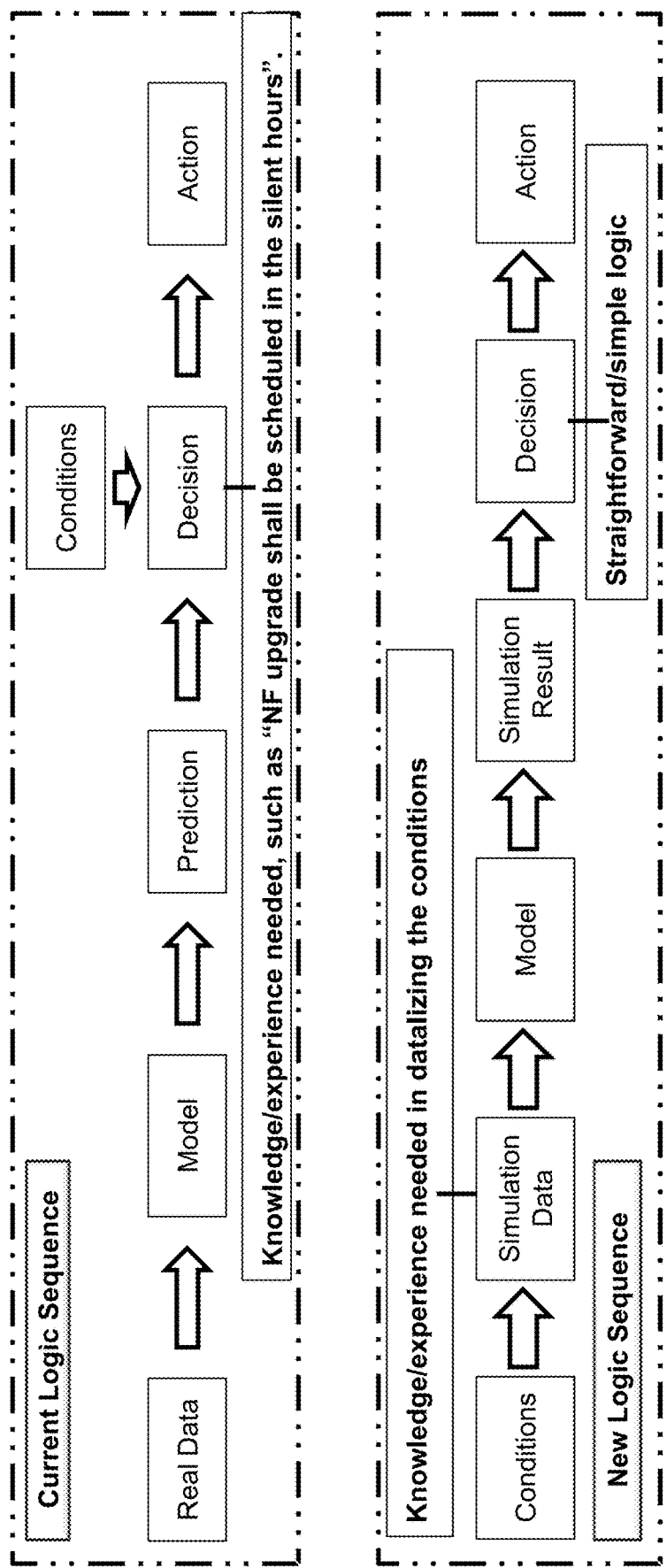
FIG. 15 shows a schematic diagram illustrating analytics implementation variants according to example embodiments.

FIG. 15 shows a schematic diagram illustrating analytics implementation variants according to example embodiments, and in particular illustrates differences between a normal approach (i.e., potentially a current logic sequence), and an approach according to example embodiments (i.e., a new logic sequence).

Figure 16:
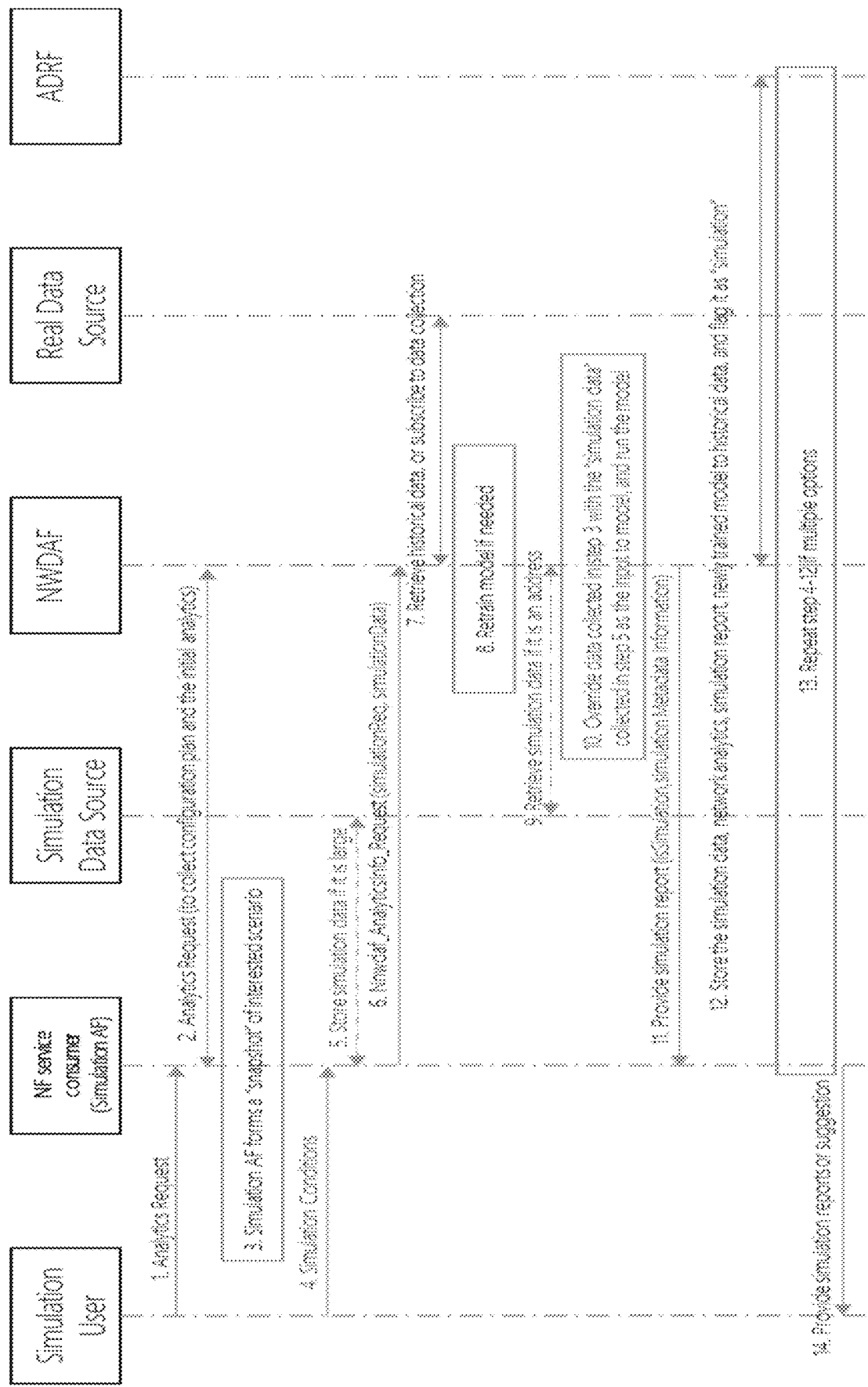
FIG. 16 shows a schematic diagram of signaling sequences according to example embodiments.

FIG. 16 shows a schematic diagram of signaling sequences according to example embodiments, and in particular illustrates a general logic flow for the NWDAF simulation function.

Figure 17:
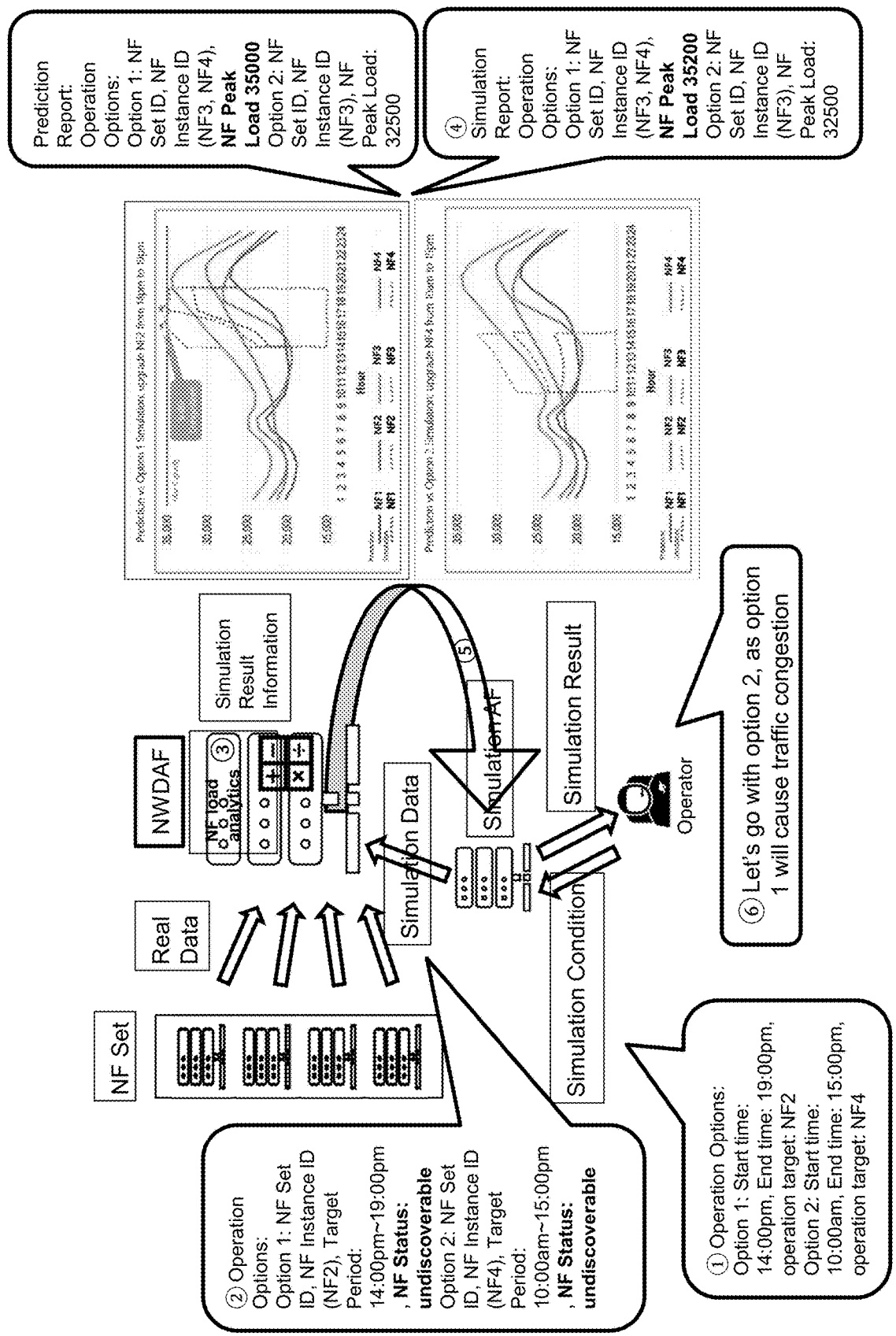
FIG. 17 shows a schematic diagram illustrating an example scenario handled utilizing analytics according to example embodiments.

FIG. 17 shows a schematic diagram illustrating an example scenario handled utilizing analytics according to example embodiments, and in particular illustrates a detailed flow for the use case example mentioned above (in relation to FIG. 14).

According to example embodiments, an approach can be decomposed into two logical steps, namely (1.) the ability to generate data and a configuration plan that represent a hypothetical scenario, and (2.) the ability for an NF service consumer (e.g., simulation AF) to instruct (send request for a simulation service to) the NWDAF to generate analytics using a specific set of simulation data to run the simulation.

(1.) The ability to generate data and a configuration plan that represent a hypothetical scenario:

Firstly, a "simulation AF" is introduced according to example embodiments, which translates "simulation conditions" into "simulation data", requests the simulation service from the NWDAF to generate analytics for the simulation scenario (i.e., using the simulation data provided by the simulation AF), and controls a logic to aggregate results from different analytics, e.g., corresponding to different possible options in the simulation scenario.

Heretofore, optionally, the "simulation AF" collects a "configuration plan" of the interested system from OAM, NRF, AF or other NF. A "configuration plan" is the setup of the framework of interested system, e.g., the network topology in above use case.

Further, optionally, the "simulation AF" requests "initial analytics" of the simulation scenario. The "initial analytics" will provide a baseline for the "simulation AF" to create the "simulation data", e.g., the data formats, the predicted situation of the interested system without the "simulation conditions".

Further, according to the "simulation conditions (constraints)", the "simulation AF" creates the "simulation data", and requests a new analytics with such "simulation data".

Secondly, a new attribute "simulationReq" is introduced in Nnwdaf_AnalyticsSubscription and Nnwdaf_AnalyticsInfo request body, indicating this is a "simulation" request.

Thirdly, a new attribute "simulationData" might be carried in the service request (if small volume), or, instead, a pointer to the simulation data; in the latter case, the NWDAF would then use regular data collection procedures to collect it.

The table below illustrates the mentioned new attributes to be added to Nnwdaf_AnalyticsSubscription_Subscribe, Nnwdaf_AnalyticsInfo_Request request, and Nnwdaf_MLModelProvision_Subscribe service operations.

Fourthly, the "simulation AF" may be a standalone NF or a new function/service within the NWDAF.

Fifthly, the simulation request may come from any consumer NF to the NWDAF, and is not limited to a "simulation AF".

(2.) The ability for an NF service consumer (e.g., simulation AF) to instruct (send request for a simulation service to) the NWDAF to generate analytics using a specific set of simulation data to run the simulation:

Firstly, the "simulation" function is introduced to NWDAF, for both Nnwdaf_AnalyticsSubscription and Nnwdaf_AnalyticsInfo services (i.e. adding the new parameters simulationReq and simulationData as described above).

Heretofore, when receiving a service request (either Nnwdaf_AnalyticsSubscription or Nnwdaf_AnalyticsInfo), the NWDAF will first collect needed data through the regular data collection procedures from other NF. NWDAF may skip to collect real data from those data sources where "simulation data" is provided.

Further, when the "simulationReq" attribute is present and its value is "TRUE", the NWDAF will collect the "simulation data" from the message, or from the network address if the "simulationData" attribute is a pointer to the data.

Further, when the "simulationReq" attribute is present and its value is "TRUE", depending on the simulation data, an existing, or a new, or a retrained model may be required to generate the simulation information. The NWDAF may request the model generation to another NWDAF instance containing ML model training capabilities. To support this case, Nnwdaf_MLModelProvision_Subscribe service is enhanced with the two new parameters simulationReq and Simulation Data.

Further, when "simulation data" is collected, the NWDAF will override (for this analytics context) the real data collected as mentioned above ("when receiving a service request (either Nnwdaf_AnalyticsSubscription or Nnwdaf_AnalyticsInfo), the NWDAF will first collect needed data through the regular data collection procedures from other NF") with the simulation data collected as mentioned above ("when the "simulationReq" attribute is present and its value is "TRUE", the NWDAF will collect the "simulation data" from the message, or from the network address if the "simulationData" attribute is a pointer to the data"), as the input to run the analytics.

Secondly, the "simulation data" (as well as metadata) may be stored into an ADRF but marked as simulation data, e.g., for reuse by the simulation AF for potential future simulation requests.

Thirdly, the network analytics generated by the NWDAF may be stored into the ADRF but marked as simulation

| Attribute name | Data type | Description | Applicability |
|---|---|---|---|
| simulationReq | integer | Default is "FALSE". | |
| simulationData | Events or pointer to data source | Provides simulated events to NWDAF to generate analytics or train a model based on the simulated data. Events can be included in the parameter, or the parameter can provide a pointer to where the simulation data can be retrieved from. Shall be provided if simulationReq is "TRUE", otherwise is absent. | | analytics, e.g., for reuse by the simulation AF or NWDAF for potential future analytics requests.

Fourthly, the "simulation report" may be stored into ADRF but marked as simulation report, e.g., for reuse by the simulation AF for potential future simulation requests.

Fifthly, the newly trained model may be stored into ADRF but marked as simulation model, e.g., for reuse by the simulation AF for potential future simulation requests.

Sixthly, the DCCF is also provided with some extensions to identify an analytics request for "simulation" and will not merge that request with a similar analytics request but using the real data source.

The table below illustrates the mentioned new attributes to be added to Nnwdaf_AnalyticsSubscription_Notify, Nnwdaf_AnalyticsInfo_Request response, and Nnwdaf_MLModelProvision_Notify.

| Attribute name | Data type | Description | Applicability |
|---|---|---|---|
| isSimulation | binary | Indicates that returned information is based on a simulation request using simulated data. | |
| simulation Metadata Information | | (optional) Provides additional information on the simulation, e.g. the ML model used and whether the ML model was trained specifically on the simulation data provided as part of the request. | |

Figure 18:
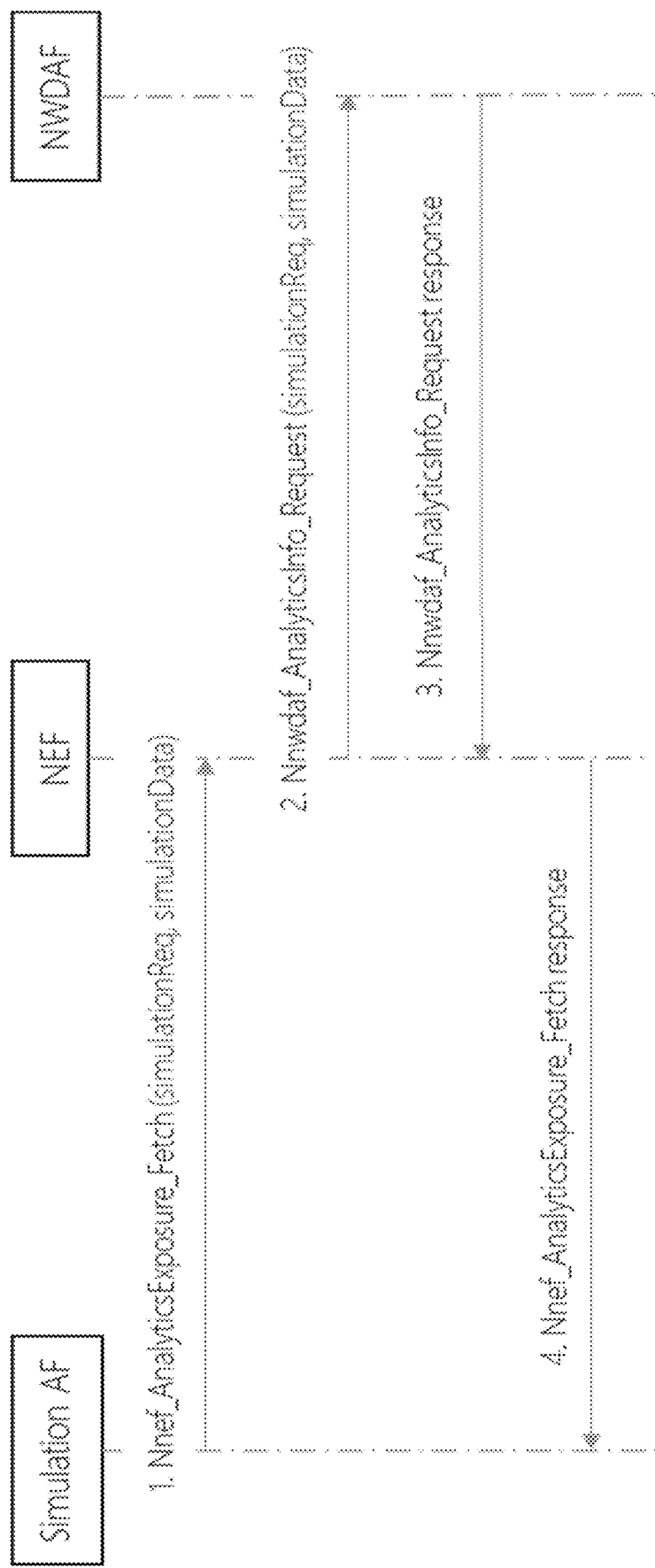
FIG. 18 shows a schematic diagram of signaling sequences according to example embodiments.

FIG. 18 shows a schematic diagram of signaling sequences according to example embodiments, and in particular illustrates an Nnef_AnalyticsExposure_Fetch message and an Nnwdaf_AnalyticsInfo_Request message according to example embodiments.

According to example embodiments, the Nnwdaf_AnalyticsInfo_Request by AF may be implemented (e.g., TS23.288) as "Nnwdaf_AnalyticsInfo_Request (simulation request)". The simulation data may be provided either directly within the request (as shown in FIG. 18) or indirectly by providing a reference (address) of where the simulation data can be fetched from.

According to example embodiments, an Nadrf_DataManagement_StorageRequest service operation may be provided (e.g. TS23.288) with the following parameters:

Service operation name: Nadrf_DataManagement_StorageRequest

Description: The consumer NF uses this service operation to request the ADRF to store data or analytics. Data or analytics are provided to the ADRF in the request message.

Inputs, Required: Data or Analytics to be stored.

Inputs, Optional: Simulation Flag.

Outputs Required: Result Indication.

Outputs, Optional: Storage Transaction Identifier.

According to example embodiments, an Nadrf_DataManagement_StorageSubscriptionRequest service operation may be provided (e.g., TS23.288) with the following parameters:

Service operation name: Nadrf_DataManagement_StorageSubscriptionRequest

Description: The consumer (NWDAF or DCCF) uses this service operation to request the ADRF to initiate a subscription for data or analytics (see clause 6.2B.3). Data or analytics provided in notifications as a result of the subsequent subscription by the ADRF are stored in the ADRF.

This service operation provides parameters needed by the ADRF to initiate the subscription (to a DCCF or NWDAF).

Inputs, Required: Service operation, Analytics Specification or Data Specification, Target NF (or Set) to subscribe to for notifications.

"Service Operation" identifies the service used to request data or analytics from a Data Source (e.g. Namf_EventExposure_Subscribe or Nnwdaf_AnalyticsSubscription_Subscribe)

"Analytics Specification or Data Specification" is the "Service Operation" specific required and optional input parameters that identify the data to be collected (e.g. Analytics ID(s)/Event ID (s), Target of Analytics Reporting or Target of Event Reporting, Analytics Filter or Event Filter, etc.). Service Operations and input parameters are defined in clause 7 for NWDAF and in TS 23.502 [3], clause 5.2 for the other NFs.

"Target NF (or Set) to subscribe to for notifications" may be a DCCF or NWDAF that can provide the data or analytics Inputs, Optional: Formatting Instructions, Processing Instructions, Simulation Flag.

Formatting Instructions and Processing Instructions are as defined in clause 5A.4.

Outputs Required: Transaction Reference ID.

Outputs, Optional: None.

Figure 19:
FIG. 19 shows a schematic diagram of signaling sequences according to example embodiments.

FIG. 19 shows a schematic diagram of signaling sequences according to example embodiments, and in particular illustrates details of an Nnwdaf_AnalyticsInfo_Request service operation.

According to example embodiments, the Nnwdaf_AnalyticsInfo_Request service operation may be implemented (e.g. TS29.520) as "Nnwdaf_AnalyticsInfo_Request (simulation request)". The simulation data are provided either directly within the request (as shown in FIG. 19) or indirectly by providing a reference (address) of where the simulation data can be fetched from.

Figure 20:
FIG. 20 shows a schematic diagram of signaling sequences according to example embodiments.

FIG. 20 shows a schematic diagram of signaling sequences according to example embodiments, and in particular illustrates details of an Nnwdaf_EventsSubscription_Subscribe service operation (subscription for event notifications).

Figure 21:
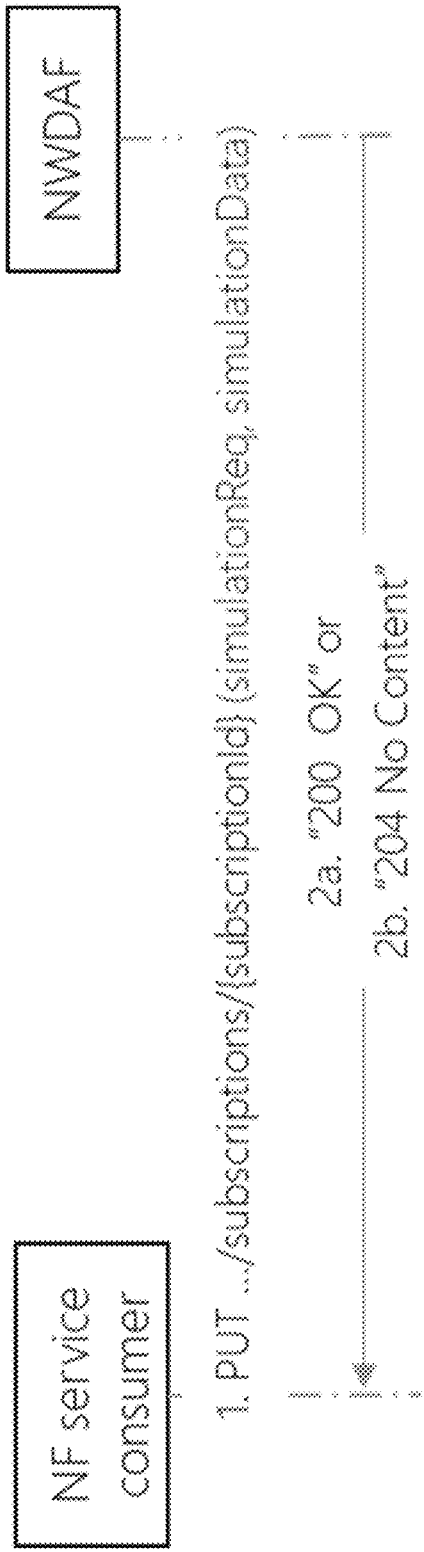
FIG. 21 shows a schematic diagram of signaling sequences according to example embodiments.

FIG. 21 shows a schematic diagram of signaling sequences according to example embodiments, and in particular illustrates details of an Nnwdaf_EventsSubscription_Subscribe service operation (update subscription (simulation data may change)).

According to example embodiments, the Nnwdaf_EventsSubscription_Subscribe service operations may be implemented (e.g. TS29.520) such that the simulation data are provided either directly within the request (as shown in FIG. 20 or 21) or indirectly by providing a reference (address) of where the simulation data can be fetched from.

Figure 22:
FIG. 22 shows a schematic diagram of signaling sequences according to example embodiments.

FIG. 22 shows a schematic diagram of signaling sequences according to example embodiments, and in particular illustrates details of an Nadrf_DataManagement_StorageRequest service operation.

According to example embodiments, the Nadrf_DataManagement_StorageRequest service operation may be implemented (e.g. TS29.575) as "Nadrf_DataManagement_StorageRequest (simulation request)". The simulation data, network analytics, simulation report, and newly trained model are provided either directly within the request or indirectly by providing a reference (address) of where the simulation data can be fetched from.

Figure 23:
FIG. 23 shows a schematic diagram of signaling sequences according to example embodiments.

FIG. 23 shows a schematic diagram of signaling sequences according to example embodiments, and in particular illustrates details of an Nadrf_DataManagement_StorageSubscriptionRequest service operation.

According to example embodiments, the Nadrf_DataManagement_StorageSubscriptionRequest service operation may be implemented (e.g. TS29.575) as "Subscription for event notifications". The simulation data, network analytics, simulation report, and newly trained model are provided either directly within the request or indirectly by providing a reference (address) of where the simulation data can be fetched from.

While example embodiments are outlined, specified and explained above with a focus on simulation operation, example embodiments are not limited to such use case.

Namely, normally, NWDAF and DCCF can request an ADRF to store analytics and data. The ADRF exposes a retrieval service so that NWDAF and DCCF can fetch analytics and data. Fetched data might be useful for NWDAF to run analytics or training, but this is part of the NWDAF internal logic, and an NWDAF service consumer cannot control what data to use.

There are cases in which an NWDAF service consumer requires an NWDAF to use a specific input data set, e.g., because certain characteristics of the data set are known to the service consumer.

Examples include testing, simulations and performance monitoring, but other use cases may be realized.

To enable the use cases above, according to example embodiments,
- a new attribute is added to the data records stored by ADRF, named DataSetName, which contains, at least, an identifier and a descriptor, as illustrated in the table below (specifying the DataSetName attribute),
- the DataSetName attribute is included in the Nadrf_DataManagement service operations, so that a service consumer can request the storage of data records using the DataSetName and/or retrieve the corresponding data records by specifying the DataSetName,
- other consumers of the ADRF services are included, such as OAM and AF,
- the DataSetName attribute is included in the Nnwdaf_AnalyticsInfo, Nnwdaf_AnalyticsSubscription, Nnwdaf_DataManagement and Nnwdaf_MLModelProvision service operations, so that a service consumer can request the NWDAF to execute operations using a certain data set, and the output of the operations will be similarly tagged with the same attribute, and
- in the cases where DCCF is used, then the DataSetName attribute may be included also in the service operations exposed by DCCF.

| Information | Description |
| --- | --- |
| DataSetIdDataSetId | Identifies the data set. |
| DataSetDescription | Provides human-readable information about the characteristics of the data set. |

Figure 24:
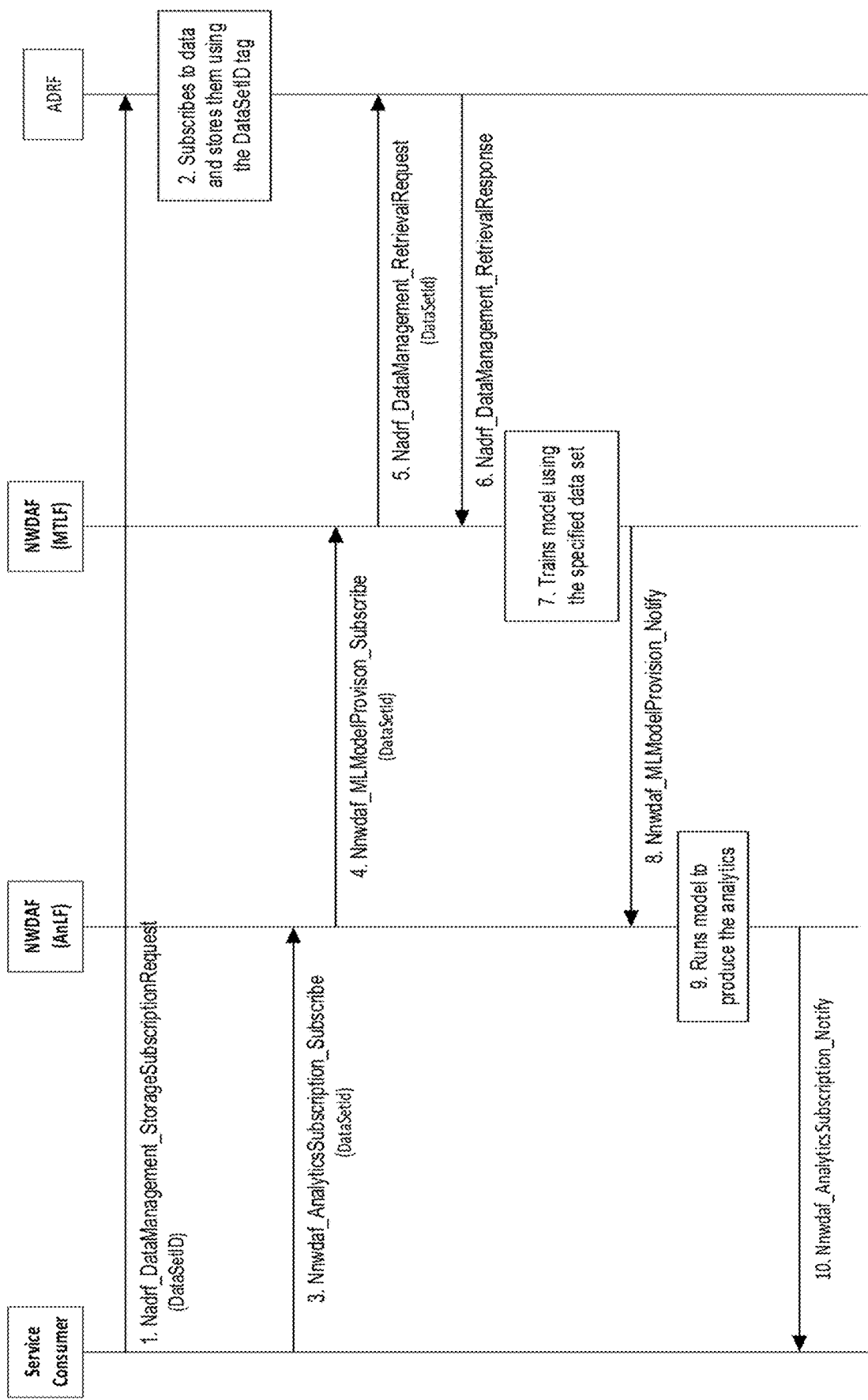
FIG. 24 shows a schematic diagram of signaling sequences according to example embodiments.

FIG. 24 shows a schematic diagram of signaling sequences according to example embodiments, and in particular illustrates an example in which a service consumer requests ADRF to store a particular data set (with a data set ID) and then instruments NWDAF to use that same data set to produce the analytics.

In step 1 of FIG. 24, according to example embodiments, a service consumer requests an ADRF to subscribe to data and to store them using a DataSetId.

In step 2 of FIG. 24, according to example embodiments, the ADRF subscribes to corresponding data sources and stores the data using the specified DataSetId.

In step 3 of FIG. 24, according to example embodiments, the service consumer requests analytics from an NWDAF, specifying to use as input data those that belong to the specified DataSetId.

In step 4 of FIG. 24, according to example embodiments, in case the NWDAF is split into an AnLF and an MTLF, then the AnLF requests the MTLF to get an ML model trained with the data set indicated by the specified DataSetId.

In step 5 of FIG. 24, according to example embodiments, the MTLF retrieves from the ADRF the data that belongs to the specified DataSetId.

In step 6 of FIG. 24, according to example embodiments, the data belonging to the specified DataSetId is provided to the MTLF.

In step 7 of FIG. 24, according to example embodiments, the MTLF trains the ML model using the specified DataSetId.

In step 8 of FIG. 24, according to example embodiments, in case the NWDAF is split into the AnLF and the MTLF, then the MTLF provides the ML model to the AnLF.

In step 9 of FIG. 24, according to example embodiments, the NWDAF executes the ML model.

In step 10 of FIG. 24, according to example embodiments, the NWDAF delivers the requested analytics to the service consumer.

According to such example embodiments, the NWDAF includes the DataSetName attribute in the Nnwdaf_AnalyticsInfo, Nnwdaf_AnalyticsSubscription, Nnwdaf_DataManagement and Nnwdaf_MLModelProvision service operations.

According to such example embodiments, further, the DCCF/MFAF includes the DataSetName attribute in the Ndccf_DataManagement service operations.

According to such example embodiments, further, the ADRF adds a new attribute to the data records stored by ADRF, named DataSetName, includes the DataSetName attribute in the Nadrf_DataManagement service operations, and includes other consumers of the ADRF services, such as OAM and AF.

The above-described procedures and functions may be implemented by respective functional elements, processors, or the like, as described below.

In the foregoing exemplary description of the network entity, only the units that are relevant for understanding the principles of the disclosure have been described using functional blocks. The network entity may comprise further units that are necessary for its respective operation. However, a description of these units is omitted in this specification. The arrangement of the functional blocks of the devices is not construed to limit the disclosure, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 25:
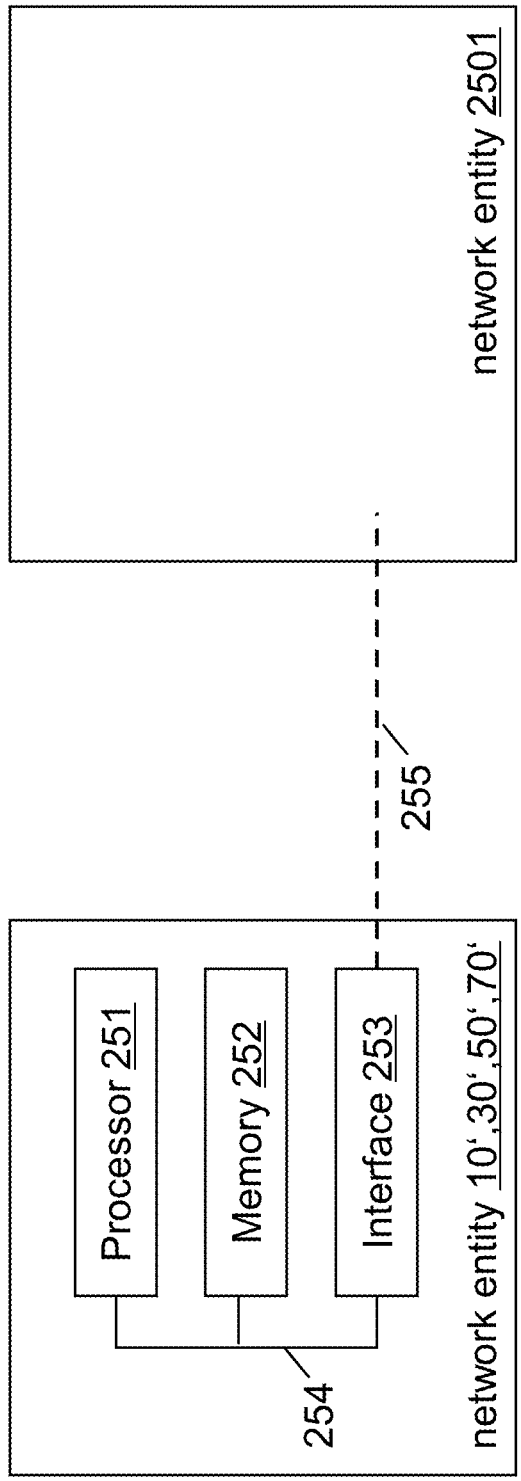
FIG. 25 is a block diagram alternatively illustrating apparatuses according to example embodiments.

In FIG. 25, an alternative illustration of apparatuses according to example embodiments is depicted. As indicated in FIG. 25, according to example embodiments, the apparatus (network entity) 10', 30', 50', 70' (corresponding to the network entity 10, 30, 50, 70) comprises a processor 251, a memory 252 and an interface 253, which are connected by a bus 254 or the like. The apparatuses 10', 30', 50', 70' may be connected to another apparatus 2501 (an interface thereof) via link 255, respectively. According to example embodiments, the another apparatus 2501 may be another one of the apparatuses 10', 30', 50', 70'.

The processor 251 and/or the interface 253 may also include a modem or the like to facilitate communication over a (hardwire or wireless) link, respectively. The interface 253 may include a suitable transceiver coupled to one or more antennas or communication means for (hardwire or wireless) communications with the linked or connected device(s), respectively. The interface 253 is generally configured to communicate with at least one other apparatus, i.e. the interface thereof.

The memory 252 may store respective programs assumed to include program instructions or computer program code that, when executed by the respective processor, enables the respective electronic device or apparatus to operate in accordance with the example embodiments.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the network entity 10 (providing analytics based on collected network operation data) comprises at least one processor 251, at least one memory 252 including computer program code, and at least one interface 253 configured for communication with at least another apparatus. The processor (i.e. the at least one processor 251, with the at least one memory 252 and the computer program code) is configured to perform receiving, from a network entity consuming analytics, an analytics demand including an input data identifier indicative of input data on the basis of which said analytics are to be performed (thus the apparatus comprising corresponding means for receiving), to perform obtaining the input data based on the input data identifier (thus the apparatus comprising corresponding means for obtaining), to perform performing said analytics on the basis of said input data (thus the apparatus comprising corresponding means for performing), and to perform providing, to said network entity consuming analytics, a result of said analytics (thus the apparatus comprising corresponding means for providing).

According to example embodiments, an apparatus representing the network entity 30 comprises at least one processor 251, at least one memory 252 including computer program code, and at least one interface 253 configured for communication with at least another apparatus. The processor (i.e. the at least one processor 251, with the at least one memory 252 and the computer program code) is configured to perform transmitting, to a network data analytics function entity providing analytics based on collected network operation data, an analytics demand including an input data identifier indicative of input data on the basis of which analytics are to be performed (thus the apparatus comprising corresponding means for transmitting), and to perform receiving, from said network data analytics function, an analytics result of said analytics performed on the basis of said input data (thus the apparatus comprising corresponding means for receiving).

According to example embodiments, an apparatus representing the network entity 50 (providing analytics based on collected network operation data) comprises at least one processor 251, at least one memory 252 including computer program code, and at least one interface 253 configured for communication with at least another apparatus. The processor (i.e. the at least one processor 251, with the at least one memory 252 and the computer program code) is configured to perform receiving, from a network entity, a simulation demand indicative of simulation conditions characterizing a network scenario to be simulated (thus the apparatus comprising corresponding means for receiving), to perform translating said simulation conditions into input data on the basis of which analytics are to be performed (thus the apparatus comprising corresponding means for translating), to perform performing said analytics on the basis of said input data (thus the apparatus comprising corresponding means for performing), to perform generating a simulation result on the basis of a result of said analytics (thus the apparatus comprising corresponding means for generating), and to perform transmitting, to said network entity, said simulation result (thus the apparatus comprising corresponding means for transmitting).

According to example embodiments, an apparatus representing the network entity 70 comprises at least one processor 251, at least one memory 252 including computer program code, and at least one interface 253 configured for communication with at least another apparatus. The processor (i.e. the at least one processor 251, with the at least one memory 252 and the computer program code) is configured to perform receiving a data storage request indicative of a data source and an input data identifier to be used (thus the apparatus comprising corresponding means for receiving), to perform subscribing to said data source (thus the apparatus comprising corresponding means for subscribing), and to perform storing input data retrieved from said data source together with said input data identifier (thus the apparatus comprising corresponding means for storing).

For further details regarding the operability/functionality of the individual apparatuses, reference is made to the above description in connection with any one of FIGS. 1 to 24, respectively.

For the purpose of the present disclosure as described herein above, it should be noted that

- method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the embodiments and its modification in terms of the functionality implemented;
- method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;
- an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for analytics control. Such measures exemplarily comprise receiving, from a network entity consuming analytics, an analytics demand including an input data identifier indicative of input data on the basis of which said analytics are to be performed, obtaining the input data based on the input data identifier, performing said analytics on the basis of said input data, and providing, to said network entity consuming analytics, a result of said analytics.

Even though the disclosure is described above with reference to the examples according to the accompanying drawings, it is to be understood that the disclosure is not restricted thereto. Rather, it is apparent to those skilled in the art that the present disclosure can be modified in many ways without departing from the scope of the inventive idea as disclosed herein.

Among others, following Items are disclosed by the above description and explanations:

Item 1. A method of a network data analytics function entity providing analytics based on collected network operation data, the method comprising receiving, from a network entity consuming analytics, an analytics demand including an input data identifier indicative of input data on the basis of which said analytics are to be performed, obtaining the input data based on the input data identifier, performing said analytics on the basis of said input data, and providing, to said network entity consuming analytics, a result of said analytics.

Item 2. The method according to Item 1, wherein said analytics demand includes said input data, and in relation to said obtaining, the method further comprises extracting said input data from said analytics demand.

Item 3. The method according to Item 1, wherein said analytics demand includes a pointer to said input data, and in relation to said obtaining, the method further comprises retrieving said input data from a network location indicated by said pointer utilizing said input data identifier.

Item 4. The method according to Item 1, wherein in relation to said obtaining, the method further comprises retrieving said input data from a network location utilizing said input data identifier.

Item 5. The method according to any of Items 1 to 4, wherein said analytics demand is an analytics request, or said analytics demand is an analytics subscription.

Item 6. The method according to any of Items 1 to 5, wherein said analytics demand includes an indicator that said analytics demand is a simulation analytics demand.

Item 7. The method according to any of Items 1 to 6, wherein said result of said analytics is indicative of that said result of said analytics is based on said analytics demand and said input data, and/or said result of said analytics is indicative of analytics meta data.

Item 8. The method according to any of Items 1 to 7, wherein in relation to said performing, the method further comprises utilizing a machine learning model.

Item 9. The method according to Item 8, further comprising transmitting a demand for generation of said machine learning model, said demand for generation of said machine learning model being indicative of said input data.

Item 10. The method according to Item 9, wherein said demand for generation of said machine learning model includes said input data, and/or said demand for generation of said machine learning model includes said input data identifier, and/or said demand for generation of said machine learning model includes a pointer to said input data.

Item 11. The method according to Item 9 or 10, wherein said demand for generation of said machine learning model includes an indicator that said demand for generation of said machine learning model is a simulation machine learning model demand.

Item 12. The method according to any of Items 1 to 11, further comprising transmitting, towards a data repository function entity, a data storage request, wherein said data storage request is indicative of at least one of said input data, said result of said analytics, and said machine learning model.

Item 13. The method according to Item 12, wherein said data storage request includes an indicator that said data storage request is a simulation related data storage request.

Item 14. The method according to any of Items 1 to 13, wherein said network entity consuming analytics is a simulation service interface entity, and/or said input data is simulation data.

Item 15. A method of a network entity consuming analytics, the method comprising transmitting, to a network data analytics function entity providing analytics based on collected network operation data, an analytics demand including an input data identifier indicative of input data on the basis of which analytics are to be performed, and receiving, from said network data analytics function, an analytics result of said analytics performed on the basis of said input data.

Item 16. The method according to Item 15, wherein said analytics result is indicative of said input data.

Item 17. The method according to Item 15 or 16, wherein said analytics demand includes said input data, and/or said analytics demand includes a pointer to said input data.

Item 18. The method according to any of Items 15 to 17, wherein said analytics demand is an analytics request, or said analytics demand is an analytics subscription.

Item 19. The method according to any of Items 15 to 18, wherein said analytics demand includes an indicator that said analytics demand is a simulation analytics demand.

Item 20. The method according to any of Items 15 to 19, wherein said analytics result is indicative of that said analytics result is based on said analytics demand and said input data, and/or said analytics result is indicative of analytics meta data.

Item 21. The method according to any of Items 15 to 20, further comprising receiving, from a network entity, a simulation demand indicative of simulation conditions characterizing a network scenario to be simulated, translating said simulation conditions into said input data, generating a simulation result on the basis of said analytics result, and transmitting, to said network entity, said simulation result.

Item 22. The method according to Item 21, wherein said simulation result includes a simulation report, and/or said simulation result includes a suggestion for addressing said network scenario to be simulated.

Item 23. The method according to Item 21 or 22, wherein in relation to said transmitting said analytics demand, the method comprises transmitting, to a first network data analytics function entity as said network data analytics function entity, a first analytics demand as said analytics demand, and transmitting, to a second network data analytics function entity as said network data analytics function entity, a second analytics demand as said analytics demand, and in relation to said receiving said analytics result, the method comprises receiving, from said first network data analytics function, a first analytics result as said analytics result, and receiving, from said second network data analytics function, a second analytics result as said analytics result, and in relation to said generating said simulation result, the method comprises aggregating said first analytics result and said second analytics result to an aggregated analytics result, and generating said simulation result on the basis of said aggregated analytics result.

Item 24. The method according to any of Items 21 to 23, further comprising collecting information on a setup for which said network scenario is to be simulated, wherein said translating is based on said information on said setup.

Item 25. The method according to any of Items 21 to 24, further comprising requesting initial analytics for said network scenario to be simulated, and receiving said initial analytics, wherein said translating is based on said information on said initial analytics.

Item 26. The method according to any of Items 15 to 25, wherein said network entity consuming analytics is a simulation service interface entity, and/or said input data is simulation data.

Item 27. A method of a network data analytics function entity providing analytics based on collected network operation data, the method comprising receiving, from a network entity, a simulation demand indicative of simulation conditions characterizing a network scenario to be simulated, translating said simulation conditions into input data on the basis of which analytics are to be performed, performing said analytics on the basis of said input data, generating a simulation result on the basis of a result of said analytics, and transmitting, to said network entity, said simulation result.

Item 28. The method according to Item 27, wherein said simulation result includes a simulation report, and/or said simulation result includes a suggestion for addressing said network scenario to be simulated.

Item 29. The method according to Items 27 or 28, wherein in relation to said performing said analytics, the method comprises performing first analytics as said analytics, and performing second analytics as said analytics, and in relation to said generating said simulation result, the method comprises aggregating a result of said first analytics and a result of said second analytics to an aggregated analytics result, and generating said simulation result on the basis of said aggregated analytics result.

Item 30. The method according to any of Items 27 to 29, further comprising collecting information on a setup for which said network scenario is to be simulated, wherein said translating is based on said information on said setup.

Item 31. The method according to any of Items 27 to 30, further comprising requesting initial analytics for said network scenario to be simulated, and receiving said initial analytics, wherein said translating is based on said information on said initial analytics.

Item 32. The method according to any of Items 27 to 31, wherein in relation to said performing, the method further comprises utilizing a machine learning model.

Item 33. The method according to Item 32, further comprising transmitting a demand for generation of said machine learning model, said demand for generation of said machine learning model being indicative of said input data.

Item 34. The method according to Item 33, wherein said demand for generation of said machine learning model includes said input data, and/or said demand for generation of said machine learning model includes an input data identifier indicative of said input data, and/or said demand for generation of said machine learning model includes a pointer to said input data.

Item 35. The method according to Item 33 or 34, wherein said demand for generation of said machine learning model includes an indicator that said demand for generation of said machine learning model is a simulation machine learning model demand.

Item 36. The method according to any of Items 27 to 35, further comprising transmitting, towards a data repository function entity, a data storage request, wherein said data storage request is indicative of at least one of said input data, said input data identifier, said result of said analytics, said simulation result, and said machine learning model.

Item 37. The method according to Item 36, wherein said data storage request includes an indicator that said data storage request is a simulation related data storage request.

Item 38. The method according to any of Items 27 to 37, wherein said input data is simulation data.

Item 39. A method of a data repository function entity, the method comprising receiving a data storage request indicative of a data source and an input data identifier to be used, subscribing to said data source, and storing input data retrieved from said data source together with said input data identifier.

Item 40. The method according to Item 39, further comprising receiving, from a data requesting entity, a data retrieval request, said data retrieval request including said input data identifier, and providing, to said data requesting entity, said input data stored together with said input data identifier.

Item 41. An apparatus of a network data analytics function entity providing analytics based on collected network operation data, the apparatus comprising receiving circuitry configured to receive, from a network entity consuming analytics, an analytics demand including an input data identifier indicative of input data on the basis of which said analytics are to be performed, obtaining circuitry configured to obtain the input data based on the input data identifier, performing circuitry configured to perform said analytics on the basis of said input data, and providing circuitry configured to provide, to said network entity consuming analytics, a result of said analytics.

Item 42. The apparatus according to Item 41, wherein said analytics demand includes said input data, and the apparatus further comprises extracting circuitry configured to extract said input data from said analytics demand.

Item 43. The apparatus according to Item 41, wherein said analytics demand includes a pointer to said input data, and the apparatus further comprises retrieving circuitry configured to receive said input data from a network location indicated by said pointer utilizing said input data identifier.

Item 44. The apparatus according to Item 41, further comprising retrieving circuitry configured to retrieve said input data from a network location utilizing said input data identifier.

Item 45. The apparatus according to any of Items 41 to 44, wherein said analytics demand is an analytics request, or said analytics demand is an analytics subscription.

Item 46. The apparatus according to any of Items 41 to 45, wherein said analytics demand includes an indicator that said analytics demand is a simulation analytics demand.

Item 47. The apparatus according to any of Items 41 to 46, wherein said result of said analytics is indicative of that said result of said analytics is based on said analytics demand and said input data, and/or said result of said analytics is indicative of analytics meta data.

Item 48. The apparatus according to any of Items 41 to 47, further comprising utilizing circuitry configured to utilize a machine learning model.

Item 49. The apparatus according to Item 48, further comprising transmitting circuitry configured to transmit a demand for generation of said machine learning model, said demand for generation of said machine learning model being indicative of said input data.

Item 50. The apparatus according to Item 49, wherein said demand for generation of said machine learning model includes said input data, and/or said demand for generation of said machine learning model includes said input data identifier, and/or said demand for generation of said machine learning model includes a pointer to said input data.

Item 51. The apparatus according to Item 49 or 50, wherein said demand for generation of said machine learning model includes an indicator that said demand for generation of said machine learning model is a simulation machine learning model demand.

Item 52. The apparatus according to any of Items 41 to 51, further comprising transmitting circuitry configured to transmit, towards a data repository function entity, a data storage request, wherein said data storage request is indicative of at least one of said input data, said result of said analytics, and said machine learning model.

Item 53. The apparatus according to Item 52, wherein said data storage request includes an indicator that said data storage request is a simulation related data storage request.

Item 54. The apparatus according to any of Items 41 to 53, wherein said network entity consuming analytics is a simulation service interface entity, and/or said input data is simulation data.

Item 55. An apparatus of a network entity consuming analytics, the apparatus comprising transmitting circuitry configured to transmit, to a network data analytics function entity providing analytics based on collected network operation data, an analytics demand including an input data identifier indicative of input data on the basis of which analytics are to be performed, and receiving circuitry configured to receive, from said network data analytics function, an analytics result of said analytics performed on the basis of said input data.

Item 56. The apparatus according to Item 55, wherein said analytics result is indicative of said input data.

Item 57. The apparatus according to Item 55 or 56, wherein said analytics demand includes said input data, and/or said analytics demand includes a pointer to said input data.

Item 58. The apparatus according to any of Items 55 to 57, wherein said analytics demand is an analytics request, or said analytics demand is an analytics subscription.

Item 59. The apparatus according to any of Items 55 to 58, wherein said analytics demand includes an indicator that said analytics demand is a simulation analytics demand.

Item 60. The apparatus according to any of Items 55 to 59, wherein said analytics result is indicative of that said analytics result is based on said analytics demand and said input data, and/or aid analytics result is indicative of analytics meta data.

Item 61. The apparatus according to any of Items 55 to 60, further comprising receiving circuitry configured to receive, from a network entity, a simulation demand indicative of simulation conditions characterizing a network scenario to be simulated, translating circuitry configured to translate said simulation conditions into said input data, generating circuitry configured to generate a simulation result on the basis of said analytics result, and transmitting circuitry configured to transmit, to said network entity, said simulation result.

Item 62. The apparatus according to Item 61, wherein said simulation result includes a simulation report, and/or said simulation result includes a suggestion for addressing said network scenario to be simulated.

Item 63. The apparatus according to Item 61 or 62, further comprising transmitting circuitry configured to transmit, to a first network data analytics function entity as said network data analytics function entity, a first analytics demand as said analytics demand, and to transmit, to a second network data analytics function entity as said network data analytics function entity, a second analytics demand as said analytics demand, and receiving circuitry configured to receive, from said first network data analytics function, a first analytics result as said analytics result, and to receive, from said second network data analytics function, a second analytics result as said analytics result, aggregating circuitry configured to aggregate said first analytics result and said second analytics result to an aggregated analytics result, and generating circuitry configured to generate said simulation result on the basis of said aggregated analytics result.

Item 64. The apparatus according to any of Items 61 to 63, further comprising collecting circuitry configured to collect information on a setup for which said network scenario is to be simulated, wherein said translating circuitry is configured to translate based on said information on said setup.

Item 65. The apparatus according to any of Items 61 to 64, further comprising requesting circuitry configured to request initial analytics for said network scenario to be simulated, and receiving circuitry configured to receive said initial analytics, wherein said translating circuitry is configured to translate based on said information on said initial analytics.

Item 66. The apparatus according to any of Items 55 to 65, wherein said network entity consuming analytics is a simulation service interface entity, and/or said input data is simulation data.

Item 67. An apparatus of a network data analytics function entity providing analytics based on collected network operation data, the apparatus comprising receiving circuitry configured to receive, from a network entity, a simulation demand indicative of simulation conditions characterizing a network scenario to be simulated, translating circuitry configured to translate said simulation conditions into input data on the basis of which analytics are to be performed, performing circuitry configured to perform said analytics on the basis of said input data, generating circuitry configured to generate a simulation result on the basis of a result of said analytics, and transmitting circuitry configured to transmit, to said network entity, said simulation result.

Item 68. The apparatus according to Item 67, wherein said simulation result includes a simulation report, and/or said simulation result includes a suggestion for addressing said network scenario to be simulated.

Item 69. The apparatus according to Items 67 or 68, further comprising performing circuitry configured to perform first analytics as said analytics, and to perform second analytics as said analytics, and aggregating circuitry configured to aggregate a result of said first analytics and a result of said second analytics to an aggregated analytics result, and generating circuitry configured to generate said simulation result on the basis of said aggregated analytics result.

Item 70. The apparatus according to any of Items 67 to 69, further comprising collecting circuitry configured to collect information on a setup for which said network scenario is to be simulated, wherein said translating circuitry is configured to translate based on said information on said setup.

Item 71. The apparatus according to any of Items 67 to 70, further comprising requesting circuitry configured to request initial analytics for said network scenario to be simulated, and receiving circuitry configured to receive said initial analytics, wherein said translating circuitry is configured to translate based on said information on said initial analytics.

Item 72. The apparatus according to any of Items 67 to 71, further comprising utilizing circuitry configured to utilize a machine learning model.

Item 73. The apparatus according to Item 72, further comprising transmitting circuitry configured to transmit a demand for generation of said machine learning model, said demand for generation of said machine learning model being indicative of said input data.

Item 74. The apparatus according to Item 73, wherein said demand for generation of said machine learning model includes said input data, and/or said demand for generation of said machine learning model includes an input data identifier indicative of said input data, and/or said demand for generation of said machine learning model includes a pointer to said input data.

Item 75. The apparatus according to Item 73 or 74, wherein said demand for generation of said machine learning model includes an indicator that said demand for generation of said machine learning model is a simulation machine learning model demand.

Item 76. The apparatus according to any of Items 67 to 75, further comprising transmitting circuitry configured to transmit, towards a data repository function entity, a data storage request, wherein said data storage request is indicative of at least one of said input data, said input data identifier, said result of said analytics, said simulation result, and said machine learning model.

Item 77. The apparatus according to Item 76, wherein said data storage request includes an indicator that said data storage request is a simulation related data storage request.

Item 78. The apparatus according to any of Items 67 to 77, wherein said input data is simulation data.

Item 79. An apparatus of a data repository function entity, the apparatus comprising receiving circuitry configured to receive a data storage request indicative of a data source and an input data identifier to be used, subscribing circuitry configured to subscribe to said data source, and storing circuitry configured to store input data retrieved from said data source together with said input data identifier.

Item 80. The apparatus according to Item 79, further comprising receiving circuitry configured to receive, from a data requesting entity, a data retrieval request, said data retrieval request including said input data identifier, and providing circuitry configured to provide, to said data requesting entity, said input data stored together with said input data identifier.

Item 81. An apparatus of a network data analytics function entity providing analytics based on collected network operation data, the apparatus comprising at least one processor, at least one memory including computer program code, and at least one interface configured for communication with at least another apparatus, the at least one processor, with the at least one memory and the computer program code, being configured to cause the apparatus to perform: receiving, from a network entity consuming analytics, an analytics demand including an input data identifier indicative of input data on the basis of which said analytics are to be performed, obtaining the input data based on the input data identifier, performing said analytics on the basis of said input data, and providing, to said network entity consuming analytics, a result of said analytics.

Item 82. The apparatus according to Item 81, wherein said analytics demand includes said input data, and in relation to said obtaining, the at least one processor, with the at least one memory and the computer program code, being configured to cause the apparatus to perform: extracting said input data from said analytics demand.

Item 83. The apparatus according to Item 81, wherein said analytics demand includes a pointer to said input data, and in relation to said obtaining, the at least one processor, with the at least one memory and the computer program code, being configured to cause the apparatus to perform: retrieving said input data from a network location indicated by said pointer utilizing said input data identifier.

Item 84. The apparatus according to Item 81, wherein in relation to said obtaining, the at least one processor, with the at least one memory and the computer program code, being configured to cause the apparatus to perform: retrieving said input data from a network location utilizing said input data identifier.

Item 85. The apparatus according to any of Items 81 to 84, wherein said analytics demand is an analytics request, or said analytics demand is an analytics subscription.

Item 86. The apparatus according to any of Items 81 to 85, wherein said analytics demand includes an indicator that said analytics demand is a simulation analytics demand.

Item 87. The apparatus according to any of Items 81 to 86, wherein said result of said analytics is indicative of that said result of said analytics is based on said analytics demand and said input data, and/or said result of said analytics is indicative of analytics meta data.

Item 88. The apparatus according to any of Items 81 to 87, wherein in relation to said performing, the at least one processor, with the at least one memory and the computer program code, being configured to cause the apparatus to perform: utilizing a machine learning model.

Item 89. The apparatus according to Item 88, wherein the at least one processor, with the at least one memory and the computer program code, being configured to cause the apparatus to perform: transmitting a demand for generation of said machine learning model, said demand for generation of said machine learning model being indicative of said input data.

Item 90. The apparatus according to Item 89, wherein said demand for generation of said machine learning model includes said input data, and/or said demand for generation of said machine learning model includes said input data identifier, and/or said demand for generation of said machine learning model includes a pointer to said input data.

Item 91. The apparatus according to Item 89 or 90, wherein said demand for generation of said machine learning model includes an indicator that said demand for generation of said machine learning model is a simulation machine learning model demand.

Item 92. The apparatus according to any of Items 81 to 91, wherein the at least one processor, with the at least one memory and the computer program code, being configured to cause the apparatus to perform: transmitting, towards a data repository function entity, a data storage request, wherein said data storage request is indicative of at least one of said input data, said result of said analytics, and said machine learning model.

Item 93. The apparatus according to Item 92, wherein said data storage request includes an indicator that said data storage request is a simulation related data storage request.

Item 94. The apparatus according to any of Items 81 to 93, wherein said network entity consuming analytics is a simulation service interface entity, and/or said input data is simulation data.

Item 95. An apparatus of a network entity consuming analytics, the apparatus comprising at least one processor, at least one memory including computer program code, and at least one interface configured for communication with at least another apparatus, the at least one processor, with the at least one memory and the computer program code, being configured to cause the apparatus to perform: transmitting, to a network data analytics function entity providing analytics based on collected network operation data, an analytics demand including an input data identifier indicative of input data on the basis of which analytics are to be performed, and receiving, from said network data analytics function, an analytics result of said analytics performed on the basis of said input data.

Item 96. The apparatus according to Item 95, wherein said analytics result is indicative of said input data.

Item 97. The apparatus according to Item 95 or 96, wherein said analytics demand includes said input data, and/or said analytics demand includes a pointer to said input data.

Item 98. The apparatus according to any of Items 95 to 97, wherein said analytics demand is an analytics request, or said analytics demand is an analytics subscription.

Item 99. The apparatus according to any of Items 95 to 98, wherein said analytics demand includes an indicator that said analytics demand is a simulation analytics demand.

Item 100. The apparatus according to any of Items 95 to 99, whereinsai analytics result is indicative of that said analytics result is based on said analytics demand and said input data, and/or said analytics result is indicative of analytics meta data.

Item 101. The apparatus according to any of Items 95 to 100, wherein the at least one processor, with the at least one memory and the computer program code, being configured to cause the apparatus to perform: receiving, from a network entity, a simulation demand indicative of simulation conditions characterizing a network scenario to be simulated, translating said simulation conditions into said input data, generating a simulation result on the basis of said analytics result, and transmitting, to said network entity, said simulation result.

Item 102. The apparatus according to Item 101, wherein said simulation result includes a simulation report, and/or said simulation result includes a suggestion for addressing said network scenario to be simulated.

Item 103. The apparatus according to Item 101 or 102, wherein in relation to said transmitting said analytics demand, the at least one processor, with the at least one memory and the computer program code, being configured to cause the apparatus to perform: transmitting, to a first network data analytics function entity as said network data analytics function entity, a first analytics demand as said analytics demand, and transmitting, to a second network data analytics function entity as said network data analytics function entity, a second analytics demand as said analytics demand, and in relation to said receiving said analytics result, the at least one processor, with the at least one memory and the computer program code, being configured to cause the apparatus to perform: receiving, from said first network data analytics function, a first analytics result as said analytics result, and receiving, from said second network data analytics function, a second analytics result as said analytics result, and in relation to said generating said simulation result, the at least one processor, with the at least one memory and the computer program code, being configured to cause the apparatus to perform: aggregating said first analytics result and said second analytics result to an aggregated analytics result, and generating said simulation result on the basis of said aggregated analytics result.

Item 104. The apparatus according to any of Items 101 to 103, wherein the at least one processor, with the at least one memory and the computer program code, being configured to cause the apparatus to perform: collecting information on a setup for which said network scenario is to be simulated, wherein said translating is based on said information on said setup.

Item 105. The apparatus according to any of Items 101 to 104, wherein the at least one processor, with the at least one memory and the computer program code, being configured to cause the apparatus to perform: requesting initial analytics for said network scenario to be simulated, and receiving said initial analytics, wherein said translating is based on said information on said initial analytics.

Item 106. The apparatus according to any of Items 95 to 105, wherein said network entity consuming analytics is a simulation service interface entity, and/or said input data is simulation data.

Item 107. An apparatus of a network data analytics function entity providing analytics based on collected network operation data, the apparatus comprising at least one processor, at least one memory including computer program code, and at least one interface configured for communication with at least another apparatus, the at least one processor, with the at least one memory and the computer program code, being configured to cause the apparatus to perform: receiving, from a network entity, a simulation demand indicative of simulation conditions characterizing a network scenario to be simulated, translating said simulation conditions into input data on the basis of which analytics are to be performed, performing said analytics on the basis of said input data, generating a simulation result on the basis of a result of said analytics, and transmitting, to said network entity, said simulation result.

Item 108. The apparatus according to Item 107, wherein said simulation result includes a simulation report, and/or said simulation result includes a suggestion for addressing said network scenario to be simulated.

Item 109. The apparatus according to Items 107 or 108, wherein in relation to said performing said analytics, the at least one processor, with the at least one memory and the computer program code, being configured to cause the apparatus to perform: performing first analytics as said analytics, and performing second analytics as said analytics, and in relation to said generating said simulation result, the at least one processor, with the at least one memory and the computer program code, being configured to cause the apparatus to perform: aggregating a result of said first analytics and a result of said second analytics to an aggregated analytics result, and generating said simulation result on the basis of said aggregated analytics result.

Item 110. The apparatus according to any of Items 107 to 109, wherein the at least one processor, with the at least one memory and the computer program code, being configured to cause the apparatus to perform: collecting information on a setup for which said network scenario is to be simulated, wherein said translating is based on said information on said setup.

Item 111. The apparatus according to any of Items 107 to 110, wherein the at least one processor, with the at least one memory and the computer program code, being configured to cause the apparatus to perform: requesting initial analytics for said network scenario to be simulated, and receiving said initial analytics, wherein said translating is based on said information on said initial analytics.

Item 112. The apparatus according to any of Items 107 to 111, wherein in relation to said performing, the at least one processor, with the at least one memory and the computer program code, being configured to cause the apparatus to perform: utilizing a machine learning model.

Item 113. The apparatus according to Item 112, wherein the at least one processor, with the at least one memory and the computer program code, being configured to cause the apparatus to perform: transmitting a demand for generation of said machine learning model, said demand for generation of said machine learning model being indicative of said input data.

Item 114. The apparatus according to Item 113, wherein said demand for generation of said machine learning model includes said input data, and/or said demand for generation of said machine learning model includes an input data identifier indicative of said input data, and/or said demand for generation of said machine learning model includes a pointer to said input data.

Item 115. The apparatus according to Item 113 or 114, wherein said demand for generation of said machine learning model includes an indicator that said demand for generation of said machine learning model is a simulation machine learning model demand.

Item 116. The apparatus according to any of Items 107 to 115, wherein the at least one processor, with the at least one memory and the computer program code, being configured to cause the apparatus to perform: transmitting, towards a data repository function entity, a data storage request, wherein said data storage request is indicative of at least one of said input data, said input data identifier, said result of said analytics, said simulation result, and said machine learning model.

Item 117. The apparatus according to Item 116, wherein said data storage request includes an indicator that said data storage request is a simulation related data storage request.

Item 118. The apparatus according to any of Items 107 to 117, wherein said input data is simulation data.

Item 119. An apparatus of a data repository function entity, the apparatus comprising at least one processor, at least one memory including computer program code, and at least one interface configured for communication with at least another apparatus, the at least one processor, with the at least one memory and the computer program code, being configured to cause the apparatus to perform: receiving a data storage request indicative of a data source and an input data identifier to be used, subscribing to said data source, and storing input data retrieved from said data source together with said input data identifier.

Item 120. The apparatus according to Item 119, wherein the at least one processor, with the at least one memory and the computer program code, being configured to cause the apparatus to perform: receiving, from a data requesting entity, a data retrieval request, said data retrieval request including said input data identifier, and providing, to said data requesting entity, said input data stored together with said input data identifier.

List of Acronyms and Abbreviations

3GPP 3rd Generation Partnership Project
ADRF analytics data repository function
AF application function
AnLF analytics logic function
MTLF model training logic function
NWDAF network data analytics functions
PLMN public land mobile network
UE user equipment

We claim:

1. A method comprising:
    receiving, by an analytics data repository function, from a network function service consumer, a request for the analytics data repository function to: subscribe to one or more data sources to obtain data from the one or more data sources; and store the data obtained from the one or more data sources, the request comprising a data identifier and a data descriptor to be stored in association with the data obtained from the one or more data sources, wherein the data identifier comprises an identifier which identifies the data and the data descriptor comprises human-readable information about characteristics of the data;
    subscribing, by the analytics data repository function, to the one or more data sources to obtain the data from the one or more data sources; and
    obtaining, by the analytics data repository function, the data from the one or more data sources; and
    storing, by the analytics data repository function, the data obtained from the one or more data stores in association with the data identifier and the data descriptor.

2. The method according to claim 1, further comprising:
    receiving, by the analytics data repository function, from a data requesting entity, a data retrieval request, the data retrieval request including the data identifier and the data descriptor; and
    retrieving, by the analytics data repository function, the data stored in association with the data identifier and the data descriptor; and
    providing, by the analytics data repository function, to the data requesting entity, the data.

3. The method according to claim 2, wherein the data requesting entity is a network data analytics function or a data collection coordination function.

4. An apparatus comprising:
    at least one processor;
    at least one memory including computer program code of an analytics data repository function, wherein the computer program code is configured to, when executed by the at least one processor, cause the apparatus to perform operations, the operations comprising:
        receiving, from a network function service consumer, a request for the analytics data repository function: to subscribe to one or more data sources to obtain data from the one or more data sources; and store the data obtained from the one or more data sources, the request comprising a data identifier and a data descriptor to be stored in association with the data obtained from the one or more data sources, wherein the data identifier comprises an identifier which identifies the data and the data descriptor comprises human-readable information about characteristics of the data;
        subscribing, to the one or more data sources to obtain the data from the one or more data sources; and
        obtaining the data from the one or more data sources; and
        storing the data obtained from the one or more data sources in association with the data identifier and the data descriptor.

5. The apparatus according to claim 4, wherein the operations further comprise:
    receiving, from a data requesting entity, a data retrieval request, the data retrieval request including the data identifier and the data descriptor;
    retrieving the data stored in association with the data identifier and the data descriptor; and
    providing, to the data requesting entity, the data.

6. The apparatus according to claim 5, wherein the data requesting entity is a network data analytics function or a data collection coordination function.

7. A non-transitory computer-readable medium comprising instructions of an analytics data repository function, wherein when the instructions are executed by at least one processor of an apparatus, the apparatus is caused to perform operations, the operations comprising:
    receiving, from a network function service consumer, a request for the analytics data repository function to: subscribe to one or more data sources to obtain data from the one to more data sources; and store the data obtained from the one or more data sources, the request comprising an a data identifier and a data descriptor to be stored in association with the data obtained from the one or more data sources, wherein the data identifier comprises an identifier which identifies the data and the data descriptor comprises human-readable information about characteristics of the data;
    subscribing, to the one or more data sources to obtain the data from the one or more data sources; and
    obtaining the data from the one or more data sources; and
    storing the data obtained from the one or more data sources in association with the data identifier and the data descriptor.

8. The non-transitory computer-readable medium according to claim 7, wherein the operations further comprise:
    receiving, from a data requesting entity, a data retrieval request, the data retrieval request including the data identifier and the data descriptor; and
    retrieving the data stored in association with the data identifier and the data descriptor; and
    providing, to the data requesting entity, the data.

9. The non-transitory computer-readable medium according to claim 8, wherein the data requesting entity is a network data analytics function or a data collection coordination function.

* * * * *